United States Patent
Benzies

(10) Patent No.: US 12,157,060 B2
(45) Date of Patent: Dec. 3, 2024

(54) SYSTEM AND METHOD FOR PROVIDING A COMPUTER- GENERATED ENVIRONMENT

(71) Applicant: Build a Rocket Boy Games Ltd., Edinburgh (GB)

(72) Inventor: Leslie Peter Benzies, Edinburgh (GB)

(73) Assignee: Build a Rocket Boy Games Ltd., Edinburgh (GB)

( * ) Notice: Subject to any disclaimer, the term of this patent is extended or adjusted under 35 U.S.C. 154(b) by 25 days.

(21) Appl. No.: 17/942,862

(22) Filed: Sep. 12, 2022

(65) Prior Publication Data

US 2023/0001304 A1 Jan. 5, 2023

Related U.S. Application Data

(63) Continuation of application No. 17/265,124, filed as application No. PCT/GB2019/052183 on Aug. 2, 2019, now Pat. No. 11,471,775.

(30) Foreign Application Priority Data

Aug. 3, 2018 (GB) ..................................... 1812681

(51) Int. Cl.
*A63F 13/65* (2014.01)
*A63F 13/23* (2014.01)
(Continued)

(52) U.S. Cl.
CPC .............. *A63F 13/65* (2014.09); *A63F 13/23* (2014.09); *A63F 13/355* (2014.09); *A63F 13/53* (2014.09);
(Continued)

(58) Field of Classification Search
None
See application file for complete search history.

(56) References Cited

U.S. PATENT DOCUMENTS 6,267,673 B1 * 7/2001 Miyamoto .............. G06T 15/10
463/31
2007/0011273 A1 1/2007 Greenstein et al.
(Continued)

FOREIGN PATENT DOCUMENTS

CN 101360119 A 2/2009
CN 101836210 A 9/2010
(Continued)

OTHER PUBLICATIONS

Splitgate: Arena Warfare Review. https://www.youtube.com/watch?v=B37NXQio2LM. Jun. 7, 2019. (Year: 2019).*
(Continued)

*Primary Examiner* — Reginald A Renwick
(74) *Attorney, Agent, or Firm* — SoCal IP Law Group LLP; Jonathan Pearce

(57) ABSTRACT

A method and system for transition between three dimensional computer-generated environments comprises generating a first three dimensional computer-generated environment including a player avatar controllable by a user within the first three dimensional computer-generated environment, displaying, within the first three dimensional computer-generated environment, a portion of a second three dimensional computer-generated environment at a location visible to the player avatar, accepting interaction by the player avatar with the portion of the second three dimensional computer-generated environment indicating that the player avatar wishes to join the second three dimensional computer-generated environment, and causing the player avatar to transition from the first three dimensional computer-generated environment to the second three dimensional computer-generated environment in response to the interaction.

20 Claims, 15 Drawing Sheets

(51) Int. Cl.
   *A63F 13/355* (2014.01)
   *A63F 13/53* (2014.01)
   *A63F 13/87* (2014.01)
(52) U.S. Cl.
   CPC ...... *A63F 13/87* (2014.09); *A63F 2300/5553* (2013.01); *A63F 2300/8082* (2013.01)

(56) References Cited

U.S. PATENT DOCUMENTS

| | | | |
|---|---|---|---|
| 2007/0100705 | A1 | 5/2007 | Chen |
| 2007/0282695 | A1 | 12/2007 | Toper et al. |
| 2012/0059880 | A1 | 3/2012 | Sylvain et al. |
| 2013/0123019 | A1 | 5/2013 | Sullivan |

FOREIGN PATENT DOCUMENTS

| | | |
|---|---|---|
| GB | 2553892 | 3/2018 |
| WO | 2015168167 | 11/2015 |

OTHER PUBLICATIONS

World Intellectual Property Organization, International Search Report and Written Opinion dated Jan. 10, 2020 in Application No. PCT/GB2019/052183.

Polygon, "The Lab Full Gameplay on the HTC Vive", YouTube, Apr. 5, 2016 (Apr. 5, 2016), pages time marker 0:05-ime marker 1:00, XP054979878, Retrieved from the Internet: URL:https://www.youtube.com/watch?v=RtR-0waVOIA retrieved on Oct. 28, 2019], the whole document.

Reynard G. et al, "Awareness Driven Video Quality of Service in Collaborative Virtual Environments", Chi'98., Human Factors in Computing Systems, Conference Proceedings, Los Angeles, Ca, Apr. 18-23, 1998; [Chi Conference Proceedings, Human Factors in US, Computing Systems], New York, NY: ACM, Apr. 18, 1998 [Apr. 18, 1998), pp. 464-471, XP000780820, Isbn: 978-0-89791-975-3, p. 467, left-hand column, paragraph 2.

Xiaohe Yu et al, "Electronic Commerce Applications Based on Virtual Reality Technology", Management of Ecommerce and E-Government (ICMECG), 2012 International Conference on, IEEE, Oct. 20, 2012 (Oct. 20, 2012), pp. 7-9, XP032277160, DOI: 10.1109/ICMECG.2012.96 ISBN: 978-1-4673-2943-9, paragraph 0004].

Jnited Kingdom Intellectual Property Office, United Kingdom Search Report dated Aug. 23, 2019 in Application No. GB1812681.3, for claims 20-37.

Xionikl234, "OnTopReplica—How to make Any window stay on top of All other windows" YouTube, youtube.com online], Available from: https://www.youtube.com/watch?v=nzGJXIK1IIA, https://web.archive.org/ /veb/20200322231145/ ,Apr. 22, 2016,pp. 1-2,[Accessed Aug. 21, 2019].

Garshan Shankar, "The Cinema Update—our biggest release yet!", bigscreenvr.com, [online], Available from: ittps://blog.bigscreenvr.com/the-cinema-update-our-biggest-release-yet-f8cd96e4067c, Jul. 25, 2017, [Accessed Aug. 21, 2019], pp. 1-6.

Rasmus Konig Sorensen, "Review: Samsung Gear VR", flatpanelshd.com, [online], Available from:https://www.latpanelshd.com/review.php?subaction=showfull&id=1454323473, Feb. 1, 2016, [Accessed Aug. 21, 2019, )ages 1-20.

Framegame, "Oculus Rift—2D, 3D and 4D Multiplayer Movie Theatre ?!", youtube.com, [online], Available from: https://www.youtube.com/watch?v=FQfYo10NiCw, Nov. 9, 2013, 2 pages, [Accessed Aug. 21, 2019].

Jnited Kingdom Intellectual Property Office, United Kingdom Search Report dated Aug. 23, 2019 in Application No. GB1812681.3, claims 51-55, 72 and 60-71 (in part).

Jnited Kingdom Intellectual Property Office, United Kingdom Search Report dated Feb. 1, 2019 in Application No. GB1812681.3. Game Hard 4.0 ,"Oculus Video app (Very impressive theaters)", youtube.com, [online], Available from: https://www.youtube.com/watch?v= mfjmSEcGUHc, Mar. 28, 2016, 2 pages, [Accessed Jan. 31, 2019].

Garren Orf, "I watched Netflix in VR and now reality seems hollow and pointless", gizmodo.com,[online], Available rom: https://gizmodo.com/i-watched-netflix-in-vr-and-now-reality-seems-hollow-an-1732886649, Sep. 24, 2015, I pages, [Accessed Jan. 31, 2019].

PC Gamer, UK, "Psychonauts Review," Mar. 3, 2006, Games Radar. (Year: 2006).

"Weird Job Simulator Inside VR Inside VR!—Virtual Virtual Reality Gameplay—VR Oculus Rift." https://www.youtube.com/watch?v=ug1DAnOphOE. Jul. 29, 2018 (Year: 2018).

Chinese Intellectual Property Office, Office Action for Chinese Application No. 2201980065715.6, mail date Feb. 6, 2024, 4 total pages with English translation.

Youtube, The Lab Full Gameplay on the HTC Live, https://www.youtube.com/watch?v=RtR-0waVOIA, published Apr. 5, 2016.

* cited by examiner

SYSTEM AND METHOD FOR PROVIDING A COMPUTER- GENERATED ENVIRONMENT

RELATED APPLICATION INFORMATION

This application is a continuation of U.S. application Ser. No. 17/265,124, entitled: "SYSTEM AND METHOD FOR PROVIDING A COMPUTER-GENERATED ENVIRONMENT", filed on Feb. 1, 2021, which is a national stage application of PCT/GB2019/052183, filed on Aug. 2, 2019, entitled "SYSTEM AND METHOD FOR PROVIDING A COMPUTERGENERATED ENVIRONMENT", which claims priority to GB Application No. 1812681.3, filed on Aug. 3, 2018, which are hereby incorporated by reference in their entirety for all purposes.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD

The present invention relates to a system and method for providing a three dimensional computer-generated environment, for example a video game system or method.

BACKGROUND

Known video games may take place in a computer generated game world, which may be three dimensional. A character may be provided for a user to control within the game world. Such video games may provide a user with an immersive experience involving controlling a character to move within the game world and interacting with the game world. In some video games, a user may be given freedom to explore the three dimensional environment.

Known video games may provide a game world that can be simultaneously accessed by more than one user at a time from more than one computer system. These systems may be provided remotely from each other. In such online multiplayer game environments, characters controlled by different users may be visible to each other and may be able to interact with each other.

The internet provides users with remote access to content, for example, via the world wide web. Content can include web pages, pictures or videos. Video content may be streamed from a remote computing resource of a content provider to a user, via the internet or other network.

It is also well established that internet users can order products online by directing their web browser to view a merchant's web site and placing an order for products that are available for purchase on said web site.

The immersive quality of a game may be reduced by, for example, interruptions to gameplay, lack of functionality inside the game, graphical appearance.

SUMMARY

In a first aspect of the invention, there is provided a method comprising:

obtaining image data representative of one or more images; [0009] providing a three dimensional computer generated environment comprising an image display area;

rendering a view of the three dimensional computer generated environment using the image data or data derived therefrom such that the one or more images appear in the view of the three dimensional computer generated environment as if projected at said image display area.

The rendering may comprise determining at least one of geometry, texture, lighting, shading, shadow.

One or more properties of the projected images may be controllable by a user.

The one or more images may comprise frames of a video sequence characterized by a desired video frame rate and rendering the view may comprise processing said frames such that the projected images are displayed at their desired video frame rate at the image display area.

The one or more frames of the video sequence may be received at a variable streaming rate.

The method may further comprise: updating the view, at least in part, in response to at least one of a change in environmental conditions, change in viewpoint, a change in image data, activity in three dimensional computer-generated environment.

Updating the view may comprise only updating a part of the view that includes changing image data.

The method may further comprise: processing the image data in dependence on at least one property of the image display area and/or an environmental condition of the three dimensional computer generated environment and/or a viewing angle or position of the rendered view.

The image data may represent one or more images having a first image resolution, and the three dimensional computer generated environment may be displayed at a second image resolution, and the method may further comprise processing the image data such that it is displayed at the second image resolution.

Rendering the view may comprise: determining a compensation mapping based on at least one of at least one property of the image display area, an environmental condition and/or a viewing angle of the rendered view; applying the compensation mapping to the image data to produce compensated image data;

rendering the view using the compensated image data.

The method may further comprise:

modelling the three dimensional computer generated environment comprising the image display area to produce a model comprising an image display area;

processing the image data to produce an image data texture for use in rendering of the view;

applying textures to the model including applying the image data texture to the image display area of the model.

The image display area may be provided on a surface of a virtual object in the computer generated three dimensional environment. The image display area may form part of a surface of a virtual object in the computer generated three dimensional environment.

The virtual object may comprise one or more of:

a screen or other display, a billboard, a television, a monitor, a mobile phone, a tablet, a watch. The display may comprise any suitable display device or area extending in at least two dimensions that, in operation, displays an image or other content.

The image display area may be a volume of the computer generated three dimensional environment and the images may be displayed to appear as a virtual hologram in the three dimensional computer-generated environment.

The method may further comprise retrieving image data from one or more external data stores.

The provided three dimensional computer generated environment may further comprise an audio source area. The method may further comprise: [0034] retrieving audio data representative of audio associated with said one or more images; [0035] and performing an audio rendering process using said audio data or data derived therefrom thereby to produce output audio for the rendered view, wherein the audio rendering process is such that at least part of the produced output audio sounds as if it is being produced at the audio source area.

The audio data and image data may be representative of a video sequence.

The method may further comprise performing one or more further audio rendering steps to update the produced audio output in response to at least one of: a change in environmental conditions, change in viewpoint, change in relative position between character and audio source area, change in image and/or audio data, activity in the three dimensional computer-generated environment.

The three dimensional computer generated environment may be displayed as a two-dimensional representation of the three dimensional computer generated environment, for example on a screen.

According to a second aspect of the invention, which may be provided independently, there is provided a computer program product comprising computer readable instructions that are executable by a processor to perform a method according to the first aspect.

According to a third aspect of the invention, which may be provided independently, there is provided an apparatus comprising at least one display screen, at least one memory resource, and at least one processor configured to: obtaining image data representative of one or more images from the at least one memory resource;

providing a three dimensional computer generated environment comprising an image display area for display on the at least one display screen; rendering a view of the three dimensional computer generated environment on the at least one display screen using the image data or data derived therefrom such that the one or more images appear in the view of the three dimensional computer generated environment as if projected at said image display area.

The display screen may comprise or be included in any suitable type of display device. The display screen may comprise any suitable display device or area extending in at least two dimensions that, in operation, displays an image or other content.

The at least one processor may be configured to perform a method according to the first aspect.

According to a fourth aspect of the invention, which may be provided independently, there is provided a method comprising: displaying a computer-generated scene that is representative of a three dimensional computer generated environment as part of a gaming session;

providing a controllable character or other gameplay element within the three dimensional computer generated environment as part of the gaming session; displaying a panel together with the computer-generated scene as part of the gaming session, the panel providing access to one or more media content items available outside the three dimensional computer generated environment.

The computer-generated scene may be generated using a first processing resource and the one or more media content items may be hosted by a further, remote server.

The method may further comprise overlapping the displayed panel and the computer-generated scene.

The character or other gameplay element may remain controllable while the panel is displayed.

The method may further comprise receiving user input and wherein user input is receivable while the panel is displayed The displayed panel may comprise a control panel that is controllable based at least on one or more actions performed by a user in the three dimensional computer generated environment.

The method may further comprise controlling the displayed panel based on at least one property of the displayed computer generated scene, for example, brightness, colour, sound volume, viewpoint.

The method may further comprise controlling the displayed panel based on at least one environmental condition of the three dimensional computer generated environment, for example, at least one of: weather condition, lighting condition, sound levels, time of day, location.

The method may further comprise: controlling the displayed panel based on at least one action in the three dimensional computer generated environment, for example, mode of transport, speed of movement.

The method may further comprise receiving user input signals and controlling the displayed panel based at least on the user input signals.

Controlling the displayed panel may comprise at least one of:

a) displaying the panel together with the computer-generated scene;

b) selecting one or more properties of the displayed panel, for example, wherein the one or more selected properties of the displayed panel include at least one of: size, position, shape, transparency, colour, volume, brightness c) selecting one or more media content items to be displayed d) moving and/or resizing the display panel Controlling the display panel may comprise adjusting one or more properties of the displayed panel relative to one or more corresponding properties of the computer generated scene thereby to emphasise or de-emphasise the displayed panel relative to the computer-generated scene.

The method may further comprise: determining a present brightness level of the computer-generated scene and adjusting a display property of the displayed panel in accordance with a desired brightness profile and determining a present volume level of the computer-generated scene and adjusting a volume property of the displayed panel in accordance with a desired volume profile.

The method may further comprise:

providing a controllable interface in the displayed panel or in the three dimensional computer generated environment;

retrieving one or more media content items from one or more data stores or streaming one or more media content items from one or more media content providers in response to selecting one or more media content items using the interface.

The method may further comprise adjusting at least one property of the displayed computer generated scene in response to controlling the displayed panel.

The method may further comprise:

performing one or more processing steps prior to or as part of displaying computer-generated scene;

switching at least one of the processing steps to a lower resource mode in response to displaying the panel.

The one or more processing steps may comprise modelling the three dimensional environment and rendering the computer-generated scene to be displayed.

According to a fifth aspect of the invention, which may be provided independently, there is provided a computer program product comprising computer readable instructions that are executable by a processor to perform a method according to the fourth aspect.

According to a sixth aspect of the invention, which may be provided independently, there is provided an apparatus comprising at least one display screen, at least one user input device, and at least one processor configured to: display a computer-generated scene on the at least one display screen that is representative of a three dimensional computer generated environment as part of a gaming session; provide a controllable, via the at least one user input device, character or other gameplay element within the three dimensional computer generated environment as part of the gaming session; display a panel on the at least one display screen together with the computer-generated scene as part of the gaming session, the panel providing access to one or more media content items available outside the three dimensional computer generated environment.

The at least one processor may be configured to perform a method according to the fourth aspect.

According to a seventh aspect of the invention, which may be provided independently, there is provided a method comprising: providing a three dimensional computer-generated environment and providing a controllable character within the three dimensional computer-generated environment; receiving user input and controlling the character based at least on the received user input; providing a three dimensional computer-generated virtual reality device in the three dimensional computer-generated environment for generating a virtual reality environment for the controllable character.

The controllable character may be represented by an avatar and/or by displaying a point of view.

The method may further comprise:

displaying the virtual reality environment in response to controlling the character to perform an interaction process with the virtual reality device.

The virtual reality environment may be based on the three dimensional computer-generated environment. The virtual reality environment may comprise augmented reality features.

The virtual reality environment may provide access to at least one further process, for example through an interface.

The at least one further process may comprise at least one of: a computer game, a further computer process, a further software application.

A plurality of users may access the three dimensional computer generated environment and the virtual reality environment may comprise a communication interface between at least two users of the plurality of users.

The communication interface may comprise a video interface.

The three dimensional computer-generated environment may be provided at a first processing resource and the virtual environment available to the user may be provided at a second, separate, processing resource, wherein the first and second processing resources are configured to communication over a network.

The method may further comprise displaying one or more video streams when in the virtual reality environment.

The virtual reality device may comprise or be representative of a wearable item, for example, a helmet, and the interactive process comprises the character putting on the wearable item.

The method may further comprise providing an image display area in the virtual reality environment and rendering a view of the virtual reality environment using obtained image data or data derived therefrom such that the one or more images appear in the view of the virtual reality environment as if projected at said image display area.

According to an eighth aspect of the invention, which may be provided independently, there is provided a computer program product comprising computer readable instructions that are executable by a processor to perform a method according to the seventh aspect.

According to a ninth aspect of the invention, which may be provided independently, there is provided an apparatus comprising at least one display screen, at least one user input device, and at least one processor configured to: provide a three dimensional computer-generated environment for display on the at least one display screen and provide a controllable character within the three dimensional computer-generated environment; receiving user input from the at least one user input device and control the character based at least on the received user input; providing a virtual reality device in the three dimensional computer-generated environment for generating a virtual reality environment for the controllable character for display on the at least one display screen.

The at least one processor may be configured to perform a method according to the seventh aspect.

According to a tenth aspect of the present invention, which may be provided independently, there is provided a method of performing a real world transaction comprising:

providing a three dimensional computer-generated environment;

providing at least one virtual object in the three dimensional computer-generated environment, wherein the at least one virtual object is representative of at least one item or service available from one or more item or service providers;

performing a virtual transaction process associated with the at least one virtual object; and performing a real world transaction process associated with the at least one physical item or service in response to performing the virtual transaction process.

The virtual transaction process may comprise a purchase performed in the three dimensional computer-generated environment and the real world transaction process comprises a purchase performed in the real world.

The method may further comprise receiving user input and performing the virtual transaction process based on the received user input.

The method may further comprise:

providing a controllable character or other controllable gameplay element within the three dimensional computer-generated environment;

receiving user input and controlling the character or gameplay element based at least on the received user input, wherein the virtual transaction process on the at least one virtual object is performed by a user through controlling the character or other gameplay element.

The at least one virtual object may have an associated transaction area and the virtual transaction process comprises at least movement into the transaction area.

The virtual transaction process may comprise performing one or more interactive actions with the at least one virtual object.

The virtual transaction process may comprise changing a displayed view of the three dimensional computer generated environment such that the virtual object is displayed in the displayed view.

The at least one virtual object may be made available for use in the three dimensional computer-generated environment in response to successfully performing at least one of the virtual or real world transaction process.

One of more features may be made available in the three dimensional computer generated environment in response to performing the virtual transaction.

The at least one virtual object may comprise an interactive virtual object. The at least one virtual object represents a moveable item. The at least one virtual object is a three dimensional computer generated representation of a physical item associated with the real world transaction process.

The method may further comprise: sending an order signal representative of an order request for the item or service, wherein the order comprises identification data of the user and performing the real world transaction based, at least in part, on a successful authentication process of the identification data.

The method may further comprise prompting a user for further identification data in response to performing the virtual transaction.

The method may further comprise: performing one or more verification processes in the three-dimensional computer-generated environment and performing the transaction based on successful verification of the verification processes.

The virtual transaction may comprise exchange of any suitable medium of exchange in the three dimensional computer-generated environment.

The medium of exchange may be an in-game currency representative of at least one of:

real-world currency, a user in-game performance.

The method may further comprise:

receiving the real world object from the one or more item or service providers

The three dimensional computer-generated environment may comprise a shopping environment, for example, a virtual shop, store or marketplace.

According to a eleventh aspect of the invention, which may be provided independently, there is provided a computer program product comprising computer readable instructions that are executable by a processor to perform a method according to the tenth aspect.

According to a twelfth aspect of the invention, which may be provided independently, there is provided an apparatus comprising at least one display screen, at least one user input device, and at least one processor configured to:

provide a three dimensional computer-generated environment for display on the at least one display screen;

providing at least one virtual object in the three dimensional computer-generated environment, wherein the at least one virtual object is representative of at least one item or service available from one or more item or service providers;

perform a virtual transaction process associated with the at least one virtual object based on user input from the at least one user input device; and perform a real world transaction process associated with the at least one physical item or service in response to performing the virtual transaction process The at least one processor may be configured to perform a method according to the tenth aspect.

According to a thirteenth aspect of the invention, which may be provided independently, there is provided a method of performing a virtual transaction comprising:

providing a three dimensional computer-generated environment;

providing at least one virtual object in the three dimensional computer-generated environment, wherein the at least one virtual object is representative of at least one item or service available from one or more item or service providers;

performing a real world transaction process associated with the at least one physical item or service and performing a virtual transaction process associated with the at least one virtual object, in response to performing the real-world process.

The method may further comprise:

providing a controllable character or other controllable gameplay element within the three dimensional computer-generated environment;

receiving user input and controlling the character or gameplay element based at least on the received user input, wherein the virtual transaction process on the at least one virtual object is performed by a user through controlling the character or other gameplay element.

The method may further comprise providing an identifier in response to successfully performing the real world transaction process and wherein the virtual transaction process comprises performing a verification process using the identifier.

The identifier may comprise at least one of: an identification code, a bar-code, a QR code.

The at least one virtual object may have an associated transaction area and the virtual transaction process comprises at least movement into the transaction area.

The virtual transaction process may comprise performing one or more interactive actions with the at least one virtual object.

The virtual transaction process may comprise changing a displayed view of the three dimensional computer generated environment such that the virtual object is displayed in the displayed view.

The at least one virtual object may be made available for use in the three dimensional computer-generated environment in response to successfully performing at least one of the virtual or real world transaction process.

One of more features may be made available in the three dimensional computer generated environment in response to performing the virtual transaction.

The at least one virtual object may comprise an interactive virtual object. The at least one virtual object may represent a moveable item. The at least one virtual object may be a three dimensional computer generated representation of a physical item associated with the real world transaction process.

The method may further comprise:

sending an identification signal representative of identification data associated with the real-world transaction;

performing the virtual transaction based, at least in part, on a successful verification process on the identification data.

The method may further comprise prompting a user for further identification data in response to performing the virtual transaction.

The real-world transaction may comprise exchange of any suitable medium of exchange in the real-world.

The medium of exchange may be an in-game currency representative of at least one of:

real-world currency, a user in-game performance.

The method may further comprise:

receiving the real world object from the one or more item or service providers.

The three dimensional computer-generated environment may comprise a shopping environment, for example, a virtual shop, store or marketplace.

According to a fourteenth aspect of the invention, which may be provided independently, there is provided a computer program product comprising computer readable instructions that are executable by a processor to perform a method according to the thirteenth aspect.

According to a fifteenth aspect of the invention, which may be provided independently, there is provided an apparatus comprising at least one display screen, at least one user input device, and at least one processor configured to: [0165] providing a three dimensional computer-generated environment for display on the at least one display screen;

providing at least one virtual object in the three dimensional computer-generated environment, wherein the at least one virtual object is representative of at least one item or service available from one or more item or service providers;

perform a real world transaction process associated with the at least one physical item or service and perform a virtual transaction process associated with the at least one virtual object, in response to performing the real-world process, based on user input from the at least one user input device.

The at least one processor may be configured to perform a method according to the thirteenth aspect.

Any feature in one aspect of the invention may be applied to other aspects of the invention, in any appropriate combination. For example, apparatus features may be applied as method features and vice versa.

DESCRIPTION OF THE DRAWINGS

Embodiments of the invention are now described, by way of non-limiting example, and are illustrated in the following figures, in which.

DETAILED DESCRIPTION

Described embodiments include methods and systems related to generating and providing a three dimensional computer-generated environment for one or more users to navigate and interact with. The described embodiments may provide an improved immersive experience for a user controlling a character in the three dimensional computer-generated environment.

The improved immersive experience may be achieved, for example, through one or more of the following: reducing interruptions to an interactive gaming session between user and the environment, providing increased functionality for a user in the environment, improving system performance, providing an improved graphical experience, providing a user with access to functions or data otherwise only available outside the interactive session.

Described embodiments relate to methods of performing real-world and virtual transactions, methods of displaying media content items and providing one or more further virtual reality environments.

Figure 1:
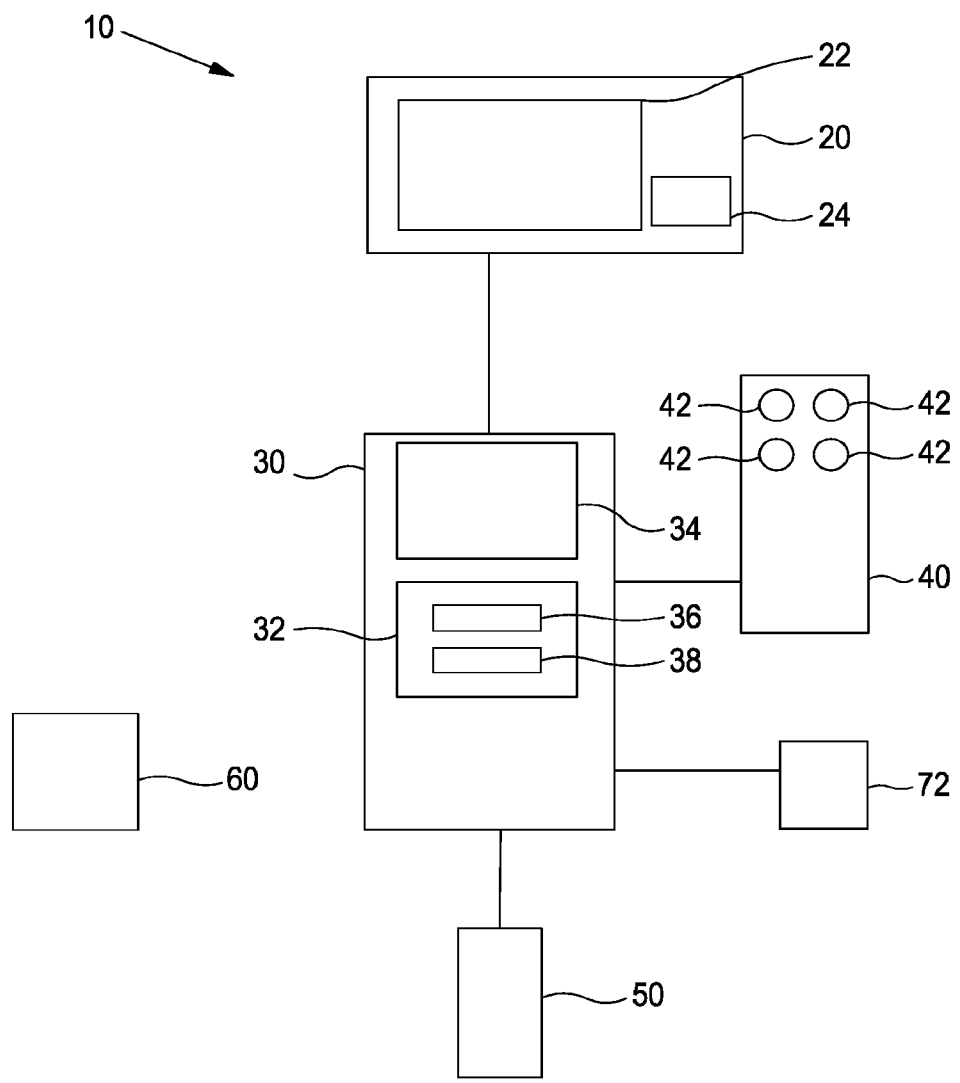
FIG. 1 is a schematic illustration of an apparatus in accordance with an embodiment.

FIG. 1 is a schematic illustration of a video game apparatus 10 in accordance with an embodiment. The video game apparatus 10 comprises a display apparatus 20, a computing apparatus 30 and a user input device 40. The computing apparatus 30 is connected to a further computing resource 50. The computing apparatus 30 may also be referred to as a computer apparatus or computing resource.

It will be understood that, in the following described embodiments, the further computing resource 50 can be representative of more than one further computing resource or of a network of further computing resources.

Computing apparatus 30 is also connected to shared further computing resource 72 that, in some embodiments, comprises a video game server. In such embodiments, the shared computing resource 72 may be referred to as a video game server or a game server. Game data is retrievable from the game server. It will be understood that shared further computing resource 72 can be representative of more than one shared further computing resource or of a network of shared further computing resources.

Display apparatus 20 comprises a display 22 configured to display visual content to be viewed by a user. In this embodiments, the display apparatus 20 is a monitor. In other embodiments, the display apparatus 20 is a television or a smart television. In other embodiments, the display apparatus 20 is a smartphone or smart device and the display 22 is a screen forming part of said smartphone or smart device. In other embodiments, the display 22 is any screen suitable for displaying images or visual content.

In the present embodiment, display apparatus 20 has a speaker 24 for emitting audio. Although in the present embodiment the speaker 24 is provided as part of the display apparatus 20, in some embodiments the speaker 24 is provided as part of a separate audio device. In other embodiments, the speaker 24 is part of a pair of headphones or headset.

Display apparatus 20 is connected to computing apparatus 30 by a video and audio interface. The interface may be configured to carry digital data and/or analogue data. It will be understood that any suitable video and audio interface can be used. Non-limiting examples include, for example, SCART, HDMI, VGA based interfaces, DVI based interfaces. In the present embodiment, the video and audio interface comprises a wired connection. In other embodiments, the video and audio interface comprise a wireless connection.

In some embodiments, uncompressed audio and video data are transmitted from the computing apparatus 30 to the display apparatus 20 over the video and audio interface. In some embodiments, at least one of the audio data and the video data transmitted from the computing apparatus 30 is compressed by compression circuitry provided as part of the computing apparatus 30 (not shown). In embodiments where compressed video and/or audio data are transmitted over the interface, the display apparatus 20 has further circuitry also referred to as compression circuitry (not shown) for uncompressing said compressed data to be displayed on display 22.

In the present embodiment, computing apparatus 30 is a personal computer (PC). In other embodiments, computing apparatus 30 is any suitable computing apparatus or combination of computing apparatuses. In some embodiments, computing apparatus 30 is a video game console e.g. a computer apparatus configured for playing video games.

Computing apparatus 30 comprises a processor 32 that is configured to provide video data to the display apparatus 20, via the video interface, to be displayed on display 22. The processor 32 may also be referred to as a processing resource. The processor 32 is further configured to provide audio data, via the audio interface, to the display apparatus 20 to be broadcast by speaker 24. The processor 32 may also be referred to as a processing resource or a local processor.

In the present embodiment, the processor 32 is configured to provide video data to the display apparatus 20, as a live feed of images, for example a feed of images at least 45 frames a second. In some circumstances, game applications may use a higher frame rate than non-game media. Such a higher frame rate may be a component of the game system feeling immersive to the user.

The computing apparatus 30 comprises a memory 34 configured to store instructions, data and files needed for generating a computer-generated environment or part thereof.

In the present embodiment, the processor 32 has dedicated processing circuitry. The processor 32 has graphics processing circuitry 36 configured to process and produce video data intended for display by the display apparatus 20. The graphics processing circuitry 36 may also be referred to as a graphics processing unit. The graphics processing circuitry 36 is configured for processing video data. The processor 32 also has audio processing circuitry 38 configured to process and produce audio data intended for broadcast by the speaker 24. The audio processing circuitry 38 is configured for processing audio data.

The processor 32 may comprise environment circuitry configured to generate a three-dimensional environment. The three-dimensional computer-generated environment may also be referred to as the environment or game world. The computer-generated environment may be representative of a real-world environment or may have elements that would be found in a real-world environment such that the computer-generated environment appears to be representative of a real-world environment. The computer-generated environment may be provided as part of a gaming session.

The environment circuitry is configured to generate at least one computer-generated exterior environment and/or at least one computer-generated interior environment.

The processor 32 may comprise object circuitry configured to generate one or more objects for the three dimensional environment. The computer-generated objects can include structural elements, for example, buildings, roads pavements, fields, bodies of water, trees. Structural elements are generally not moveable within the three dimensional environment, however, they can be interacted with.

The computer-generated objects also include objects, for example these objects may be representative street furniture, vehicles, walls, floors, ceilings, windows, furniture. Each object may be generated and/or modelled independently. In some embodiments, structural elements are modelled independently from objects.

The objects are represented in the computer generated environment in three dimensions. For example, objects may be first represented as polygonal meshes, which may also be referred to as a wire-frame representation. Objects may be represented as a combination of geometrical shapes. Objects may be represented as a combination of surfaces. Objects may be defined in a three-dimensional coordinate system of the computer-generated environment.

In some embodiments, the graphics processing unit 36 further comprises lighting circuitry configured to produce lighting effects and/or rendering circuitry configured for image rendering. Images of the three-dimensional computer-generated environment may be rendered as if viewed from a viewing position having a coordinate position that is inside the three-dimensional environment.

In addition to the environment circuitry described above, the processor 32 may comprise further environment circuitry configured to generate a further three dimensional environment. The further environment circuitry may include virtual reality circuitry for generating a virtual reality environment for the character. The virtual reality environment may be representative of an artificial or imaginary environment and/or may not be representative of the real-world. The virtual reality environment may have elements that would not be found in a real-world environment such that the computer-generated environment appears to be representative of an artificial, imaginary world. In some embodiments, the virtual reality environment has one or more features or characteristics different to first three dimensional computer generated environment such that a user can distinguish between the first three dimensional computer generated environment and the virtual reality environment.

In some embodiments, the graphics processing unit 36 further comprises texture circuitry configured to apply textures to three dimensional models.

Objects within the environment may be rendered with any suitable image effects. For example, objects may be rendered as opaque or as at least partially transparent.

Objects may be rendered with particular colours and/or textures (for example, using texture circuitry) which may or may not be realistic. Lighting effects may simulate lighting from light fixtures and/or external light, for example light arriving through windows. Any suitable lighting methods may be used, for example ray casting or global illumination. The lighting circuitry may simulate effects of reflection and/or refraction of light.

The processor 32 further comprises input circuitry configured to process inputs from the user input device 40 and/or from other input devices. The processor 32 further comprises character circuitry. The character circuitry is configured to generate a controllable character in the environment. The character circuitry and input circuitry are configured to receive user input user device 40 and to translate said user input into instructions for the character thereby to change the behaviour and/or control the character.

Computing apparatus 30 (for example, input circuitry of the processor 32) is configured to receive inputs from the user input device 40 and/or other input devices. Computing apparatus 30 (for example, graphic processing unit 36) is configured to provide images generated in dependence on the inputs from the user input device 40 and other input devices. Computing apparatus 30 (for example, character circuitry) is configured to move or modify behaviour of the character in dependence on the inputs from the user input device 40 and other input devices.

The computer-generated environment can be navigated by a user through a video game character. A user may be presented with a view including an on-screen character or a view corresponding to point of view of the character.

In some embodiments, the scene that is rendered includes a rendering of the character. The scene that is rendered changes to reflect movement of the character. A scene rendered to include the character may also be referred to as third person perspective.

The character may be an avatar or other graphical representation of a person. In some embodiments, the character is a graphical representation of another object.

In some embodiments, no character is rendered and the scene provided corresponds to a view point of the character. The user navigates the scene by providing user input. The scene is updated to show a change in viewpoint. Rendered scenes that do not included a rendering of an character may be referred to a first person perspective.

In some embodiments, the user may be able to switch between first person perspective and third person perspective views.

In the following, it will be understood that any reference to movement or actions performed by a character in the three-dimensional environment refers to both scenes including a rendered character and scenes from a viewpoint of the character.

A user can control the character by operating user input device. In use, a user provides user input representative of an intended movement or other intended action, via the user input device 40. User input data is transmitted from the user input device 40 and received by processor 32 (for example by the input circuitry). The user input data is then processed by processor 32 and then translated into a set of instructions (for example, by character circuitry) for performing the intended movement or action. Performance of the intended movement or action include performing one or more rendering processing steps (for example, by graphics processing unit 36) in relation to the character and/or viewpoint and/or one or more objects that are being interacted with.

In some embodiments, the processor 32 may comprise camera circuitry for moving the viewpoint of the scene displayed to the user and hence updating the scene that is rendered.

In some embodiments, the camera circuitry may be configured to move the viewpoint independently of movement of the character in the environment. In some embodiments, the camera circuitry is configured to receive user input and change the viewpoint based on user input. In some embodiments, the camera circuitry is configured to automatically change the viewpoint based on movement or events happening in the computer-generated scene.

The graphics processing unit 36 is configured to produce a sequence of images in real time which provide the effect of the character being in the three-dimensional environment.

The images are rendered so as to provide a two-dimensional scene of the three-dimensional environment display by providing input data to display apparatus 20 to be displayed on display 22. The images are rendered to give the impression to a user viewing the display 22 that they are viewing a character or the point of view of a character inside the three-dimensional environment.

In further embodiments, a virtual reality system is provided for a user, such that the images can be rendered to provide a three-dimensional scene to be displayed on the virtual reality system.

The user may move the character or the viewpoint in the computer-generated scene by various means, for example by using the user input device 40 as described below.

The user may move the character and/or viewpoint in the coordinate space of the three-dimensional scene from a first viewing position to further viewing positions. As the user moves through the scene, the rendered images change in response to the change in viewing position within the scene. For example, a user may view the objects in the scene from different angles and/or distances.

In some embodiments, objects within the three-dimensional scene may be moveable based on received user input. Some objects may be manipulated by a user, for example, via the controllable character.

The processor 32 may comprise physics circuitry configured to simulate physical effects on objects, for example by making objects obey gravity. The physics circuitry may control interactions of objects with other objects, for example by causing an object to be stopped or deflected when it contacts another object, rather than passing through that object. In a games context, the provision of realistic physical interactions may be referred to as games physics. The physics circuitry may control interactions between the character and the objects.

The processor 32 may comprise input circuitry configured to process inputs from the user input device 40 and/or from other input devices.

Computing apparatus 30 (for example, input circuitry of the processor 32) is configured to receive inputs from the user input device 40. Computing apparatus 30 (for example, the graphics processing unit 36) is configured to provide images generated in dependence on the inputs from the user input device 40. In further embodiments, computing apparatus 30 is configured to receive further inputs, and to provide images generated in dependence on those further inputs. For example, the computing apparatus 30 may further receive further inputs from at least one further input device (for example, a mouse, keyboard or trackball); from further sensors or other components; from a camera or other tracking device; and/or from at least one further computing apparatus.

Computing apparatus 30 also includes other components including RAM, ROM, a data bus, an operating system including various device drivers, and hardware devices including a graphics card. Such components are not shown in FIG. 1 for clarity.

User input device 40 is configured to be used by the user for inputting commands to computing apparatus 30. In the present embodiment, user input device 40 is a joypad comprising a plurality of buttons 42 that may be pressed by the user to provide input commands. In other embodiments, the user input device 40 may be any handheld device, for example a wand or games controller. In further embodiments, the user input device 40 may be any suitable input device, for example a keyboard, mouse or joystick.

In the present embodiment, user input device 40 is connected to computing apparatus 30 by a wireless connection. In other embodiments, user input device 40 may be connected to computing apparatus 30 by any suitable wired or wireless connection.

In some embodiments, the user input device 40 is a hand-held device such as a games controller, wand, keyboard, or mouse or by detecting user gestures including body, head, hand movement In some embodiments, the computing apparatus 30 is connected to one or more further computing resources. As shown in FIG. 1, the computing apparatus 30, in accordance with embodiments, is connected to a further computing resource 50 via a network. This can be over a wireless or wired connection, or over any suitable type of network, for example, the internet.

Although only one further computing resource 50 is shown in FIG. 1, the computing apparatus 30 may be connected to more than one further computing resource, in accordance with embodiments. In some embodiments, the further computing resource 50 comprises more than one computing resource.

In some embodiments, the further computing resource 50 is associated with an item and/or service provider.

In some embodiments, the further computing resource 50 comprises one or more data stores accessible via a network. In some embodiments the further computing resource 50 includes one or more content delivery networks comprising a distribution of servers and data centres such that media content items are retrieved or streamed from the one or more content delivery networks.

In some embodiments, the further computing resource 50 includes one or more servers or computing resources for one or more merchants. In some embodiments, the further computing resource 50 includes one or more video game servers.

In some embodiments, the one or more video game servers of the computing resource 50 hosts a user game account, which stores details of a user, for example, character data, game progress data, bank account and/or in-game currency data. The user game account is secured by a password and/or other security measures.

Although in the above described embodiments, component parts of system 10, for example, the display apparatus 20, the computer apparatus 30 and the user input device 40 are described as separate devices, in some embodiments two or more of these component parts are provided as part of the same device.

In some embodiments, a portable device 60, for example, a smart phone or device, is also provided. Portable device 60 has network connectivity. Portable device 60 is used to provide further input to the computing resource 30, in addition to user input device 40. In some embodiments, functionality provided by the portable device 60 at least partially overlaps with functionality provided by the user input device 40. In some embodiments, a companion application is provided to be run on a processor of the portable device 60.

The video game apparatus 10 of FIG. 1, is configured to connect with one or more other video game apparatuses which are not shown in FIG. 1.

Figure 2:
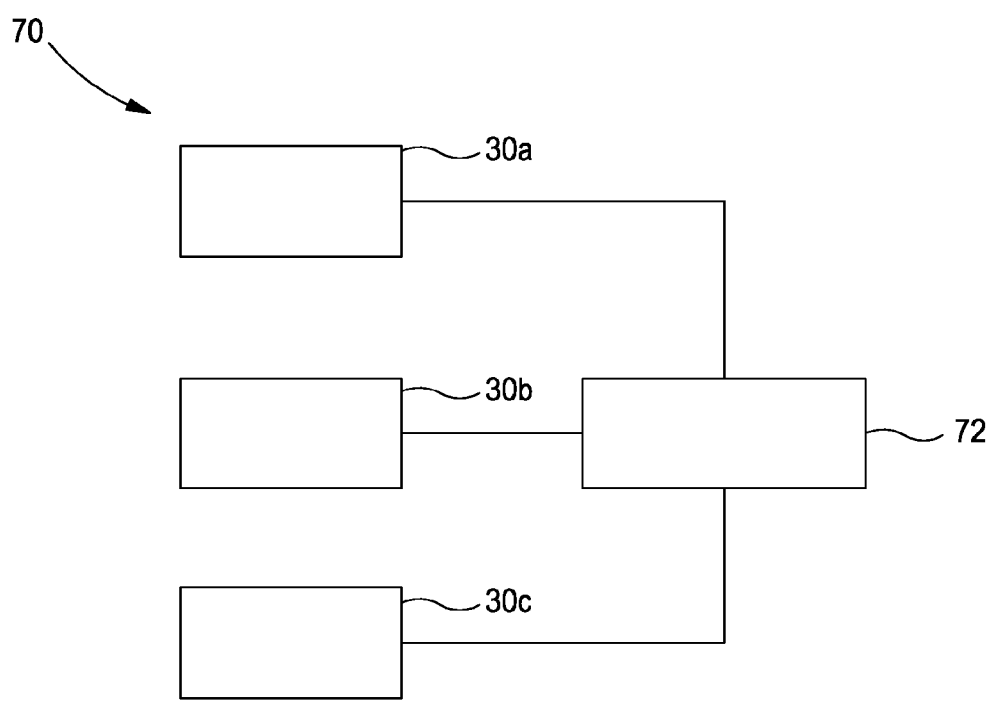
FIG. 2 is a schematic illustration of an apparatus in accordance with an embodiment.

FIG. 2 shows a schematic view of a system 70 including a plurality of user video game apparatuses, also referred to a user apparatuses, wherein each video game apparatus substantially corresponds to the user apparatus described with reference to FIG. 1. Each user apparatus includes a user input device 40, a display apparatus 20 and a computing apparatus, as described with reference to FIG. 1. System 70 has a plurality of user apparatuses. The user apparatuses are represented by their respective computing apparatuses 30a, 30b, 30c. Although only the computing apparatus of each user apparatus is shown, it will be understood that each user apparatus also comprises a respective display apparatus and user input device, substantially as described with reference to the video game apparatus 10 of FIG. 1.

The plurality of computing apparatuses 30a, 30b and 30c are communicatively connected to the shared further computing resource 72. The shared further computing resource 72 is provided in addition to the further computing resource 50 shown in FIG. 1. In some embodiments, the shared computing resource 72 comprises a video game server. In such embodiments, the shared computing resource 72 may be referred to as a video game server or a game server.

The shared further computing resource 72 comprises shared resources that the computing apparatuses 30a, 30b and 30c can obtain to provide the three dimensional computer generated environment to respective users of the plurality of computing apparatuses 30a, 30b and 30c. In the following, when describing local processor 32 performing processing steps to generate the environment, character and/or game elements, it will be understood that, in some embodiments, processor 32 operates together with shared further computing resource 72 to generate the environment, character and/or game elements.

The systems described with reference to FIG. 1 and/or FIG. 2 are configured to perform methods in accordance with the embodiments that are described in the following. The systems are configured to perform the methods described with reference to FIGS. 3, 9, 10, 12 and 14.

Figure 3:
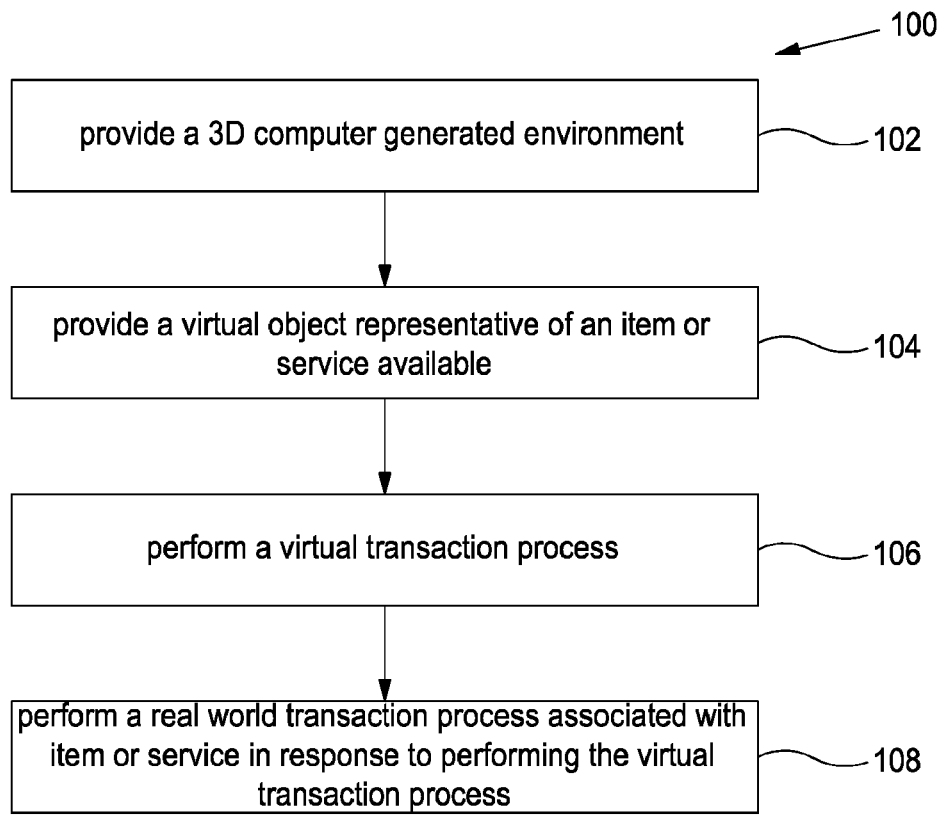
FIG. 3 is a flowchart illustrating in overview a method of an embodiment comprising performing a real-world transaction.

FIG. 3 is a flow chart illustrating in overview a method 100 of performing a real-world transaction, for example, a purchase of a real-world object, via a computer-generated environment. The real-world object is a physical object available for purchase from an item provider. For the method of FIG. 3, the further computing resource 50 includes a computing resource associated with an item and/or service provider, also referred to as a merchant. The further computing resource 50 may be a remote server, that is accessed over a wired network.

In the present embodiment, the further computing resource 50 comprises a first computing resource associated with the item and/or service provider and a second computing resource associated with a bank or financial institution for handling transactions. The computing resource of the item and/or service provider, the computing resource of the bank or financial institution and the computing apparatus 30 are configured to communicate over a network.

At stage 102 of the flowchart of FIG. 3, the processor 32 (for example, the environment circuitry) generates and provides a three dimensional environment which may also be referred to as a game word. As described above, the three dimensional environment can include interior and exterior environments.

In the present embodiment, the three dimensional environment includes an interior environment that is a shopping environment. The shopping environment is representative of a shop floor or marketplace. In some embodiments, more than one shopping environment is provided in the three-dimensional environment. Different shopping environments may be provided that are associated with different retailers.

An interior environment, for example, an inside of a building, may be entered by a user by providing user input representative of an intention to enter the interior environment to the processor 32. The user input is received and processed by processor 32 (for example by the input circuitry). The processor 32 (for example, character circuitry) translates said input and updates the character inside the environment in accordance with the user input, in this example, to control the character to enter the building.

Figure 4:
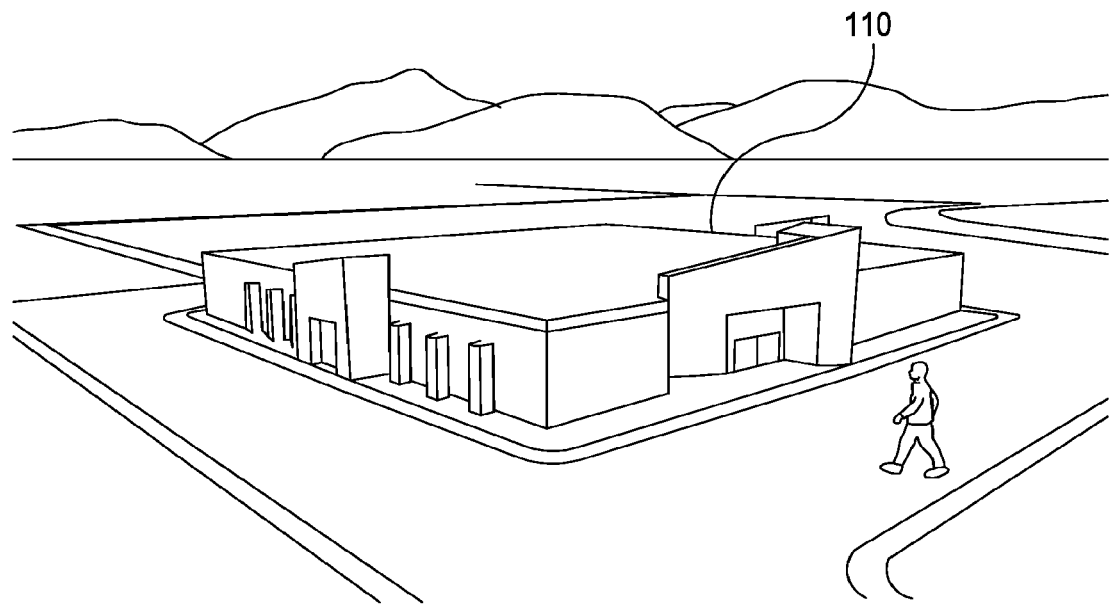
FIG. 4 is an illustration of a screen shot representative of an exterior of a virtual marketplace.
Figure 5:
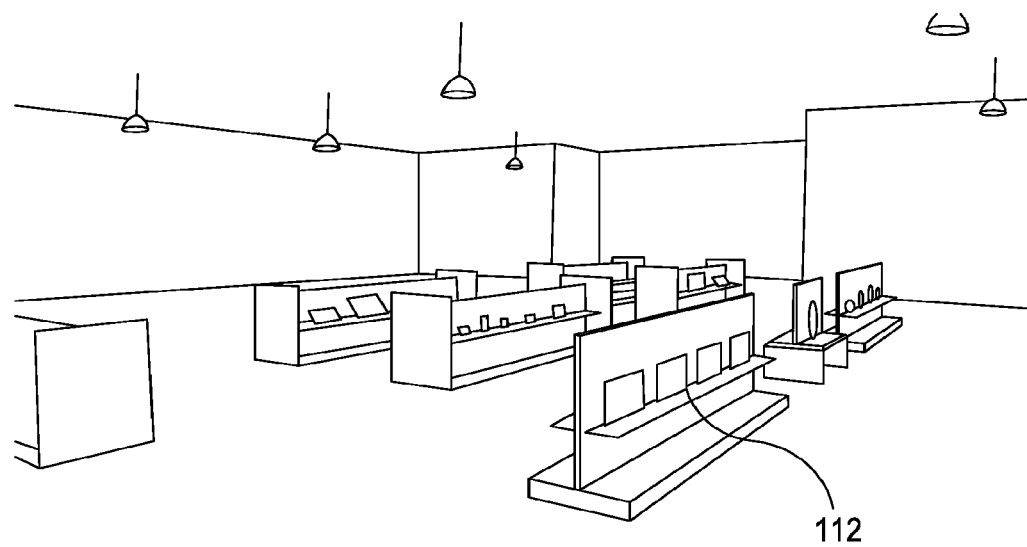
FIG. 5 is an illustration of a screen shot representative of an interior of a virtual marketplace.

A view of an exterior environment that includes a shopping complex 110 is shown in FIG. 4. The shopping complex 110 may be entered by a user, as described above, to reveal a view of the interior environment. A view of the interior environment is shown in FIG. 5.

At stage 104 of method 100 shown in FIG. 3, the processor 32 (for example the object circuitry) generates and provides a virtual object inside the three-dimensional environment. The virtual object may also be referred to as a virtual item. FIG. 5 shows a plurality of virtual objects 112 that are provided inside the shopping environment. Each of the virtual objects 112 is representative of a physical item that is offered or otherwise available in the real-world, from an item provider, in this embodiment a retailer. The item may also be referred to as a real-world object. In the present embodiment, the item is available for purchase. In other embodiments, the item is available for hire or lease. The retailer may also be referred to as a merchant.

In the present embodiment, one of the virtual objects 112 is virtual object 116 that is representative of a set of speakers that are available to purchase. The virtual object 116 is an interactive object and the character can interact with the virtual object 116 in the computer-generated environment. In the present embodiment virtual object 116 is a set of speakers.

In some embodiments, the virtual object is a wearable virtual object. For wearable virtual objects, the interaction includes, for example, inspecting and/or wearing the item. The item could be any suitable garment, for example, clothes, shoes other wearable accessories. Such wearable items, when purchased and/or when worn by a user in the three dimensional environment may provide the user in-game benefits.

In some embodiments, the virtual object is associated with a mode of transport, for example, a vehicle, for example, a bicycle or a car. As well as being made available for the user in the real-world, the purchased virtual mode of transport will be made available for the user to operate and use to move with in the computer generated environment.

In some embodiments, the item is a consumable item, for example an item of food or drink. Such an item may be consumed by the character and the character may receive health or other in-game benefits from consuming the item.

In some embodiments, the item is an electrical appliance. In some embodiments, the item is a kitchen appliance. As part of the gameplay, the user may derive benefit from purchasing and/or using the kitchen appliance.

In the present embodiment, the virtual object is a moveable item in that it can be moved by a user. The item may be moved or carried by the user from a first location to a second location. In the present embodiment, the virtual object is representative of the real-world object available for purchase and provides a three dimensional computer-generated model of the real-world object that can be inspected in the three dimensional environment.

At stage 106, a user performs a virtual transaction process using the character. A user, by providing user inputs to computing apparatus 30, can perform a virtual transaction process with the virtual object. In this embodiment, the virtual transaction process includes a user providing user input via the user input device 40, the user input being indicative of an intention to purchase the virtual object. The user input is received and processed by processor 32 (for example by the input circuitry). The processor 32 (for example the character circuitry) then controls the character in the shopping environment to perform the virtual transaction process with the virtual object 116.

The virtual transaction can include more than one step (e.g. more than one stage of user input is received). In this embodiments, the virtual transaction process includes a user providing user input to move a character to adjacent or near to the location of the virtual object in the shopping environment and, when at this location, the user provides further user input to access an on-screen menu and selects a purchase option.

Figure 6:
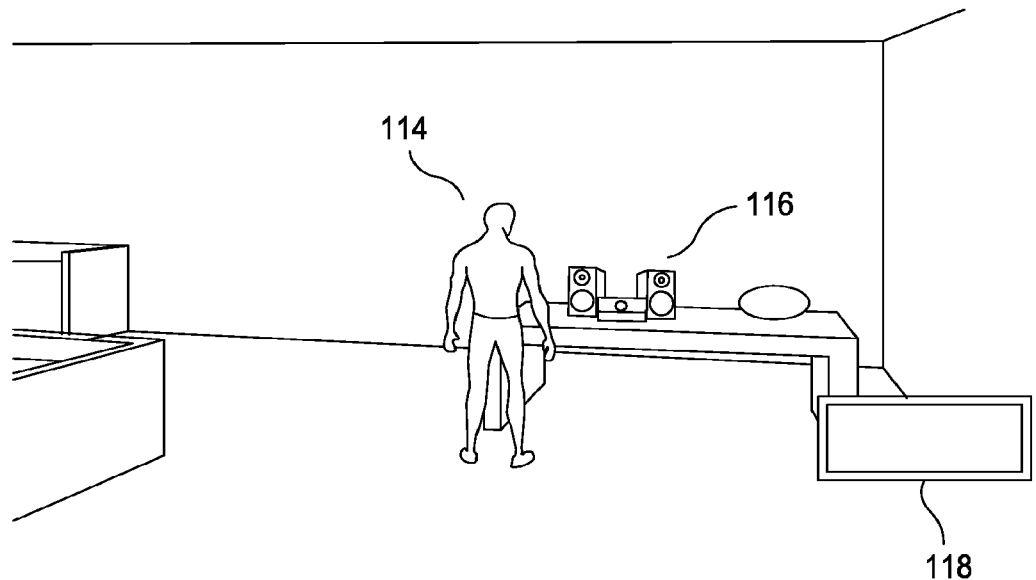
FIG. 6 is an illustration of a screen shot representative of an interior of a virtual marketplace.

FIG. 6 shows a character 114 positioned adjacent to the virtual object 116. A transaction area is provided that surrounds the virtual object in the computer generated environment, such that, on entering the transaction area a menu 118 is automatically presented to the user. The menu 118 includes a number of options, in particular, the menu includes an option to purchase the item. In some embodiments, the menu includes further options, such as, an option to inspect the item. In the present embodiment, the transaction area is not visible to a user which may provide a seamless experience for a user. The virtual transaction is therefore performed by a user controlling their character to enter the transaction area and by controlling the displayed on-screen menu to select the purchase option on the menu.

To determine if a user is in the transaction area, one or more processing steps is carried out by the processor 32. As a non-limiting example, a calculation is performed to determine if a user is inside the transaction area. The calculation uses character game data, for example, data representative of a character's location in the three dimensional computer generated environment and compares the character location data to transaction area data which is representative of the transaction area inside the three dimensional environment.

In some embodiments, the transaction area is centred or based around the virtual objects. In other embodiments, the transaction area is centred or based around another object that is not the virtual object. As a non-limiting example, and with reference to FIG. 6, the transaction area could be centred around a desk containing more than one virtual object. In further embodiments, the transaction area could correspond to an entire area of the three dimensional computer generated environment, for example, an entire store or marketplace. In such embodiments, entering the transaction area could trigger further options on a menu and/or an on-screen shopping interface.

In some embodiments, the virtual transaction is carried out without further interaction from the user, for example, it is not required that the user select a purchase option from a menu.

In some embodiments, the virtual transaction is carried out by a user controlling the viewpoint. In such embodiments, the user provides user input to change the display which is processed by the processor 32 (for example, by the camera circuitry) thereby to change or zoom the displayed view that the displayed view contains the virtual object.

As described above, in some embodiments, the view presented to the user is switchable between a third person view point in which, at least part of, the controllable character is rendered and a first person view point. In some embodiments, the virtual transaction includes the step of switching the view from the third person to the first person, for example, so that the first person view point substantially contains the virtual object. The virtual transaction process may include a confirmation step, for example, selecting the purchase option presented on the on-screen menu.

In some embodiments, a virtual transaction process includes the step of a user moving the character so that the character substantially faces the virtual object.

Figure 7:
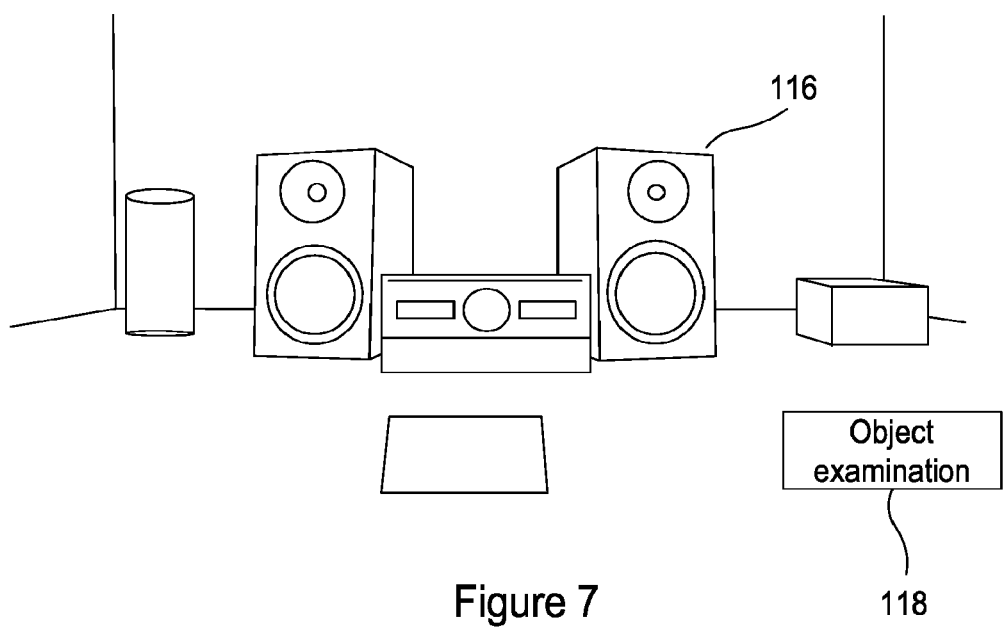
FIG. 7 is an illustration of a screen shot representative of a virtual item.

FIG. 7 shows a view presented to a user on selection of the inspection or object examination option on menu 118. A close up view of the virtual object 116, in this example, a set of virtual speakers, is shown. The view may switch from a third person view to an inspection view on selection of the inspection option. In the inspection view, a user can, by providing the appropriate input, rotate the item to view through different angles.

Although in the above described embodiment, the virtual transaction process is performed when the user is adjacent to the virtual item, in further embodiments, the virtual transaction process may be performed when a user is remote to a virtual object.

Figure 8:
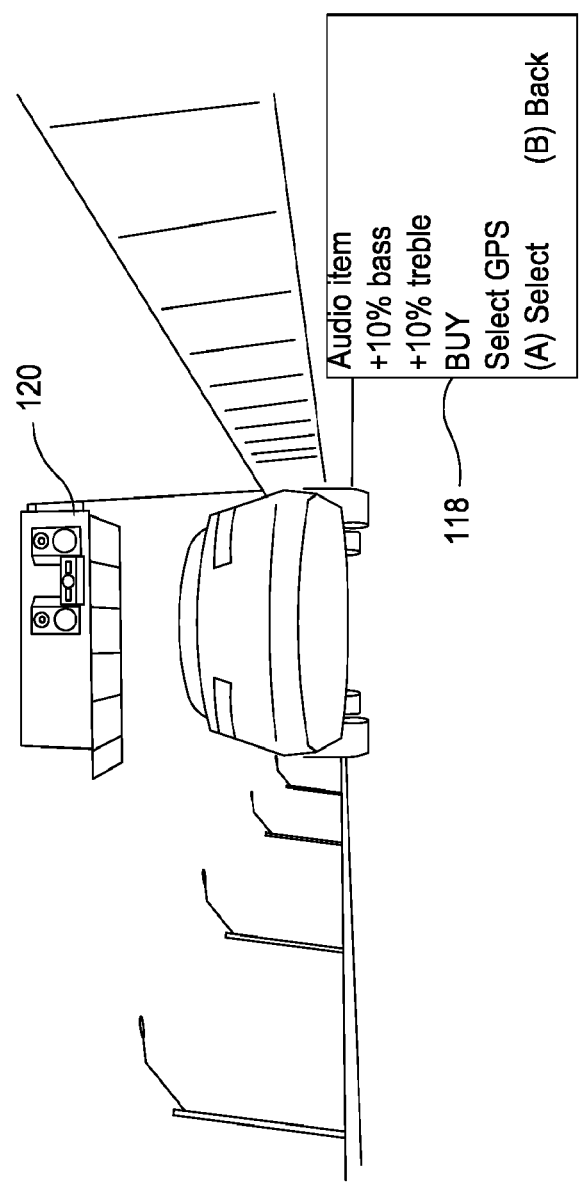
FIG. 8 is an illustration of a screen shot representative of a bill-board.

FIG. 8 shows a virtual object in the form of a billboard 120 in the computer-generated environment. The billboard displays an advertisement for an real-world item that is available for sale in the real-world. The billboard is representative of the real-world item. In this embodiment, for virtual items that are positioned remotely from a user, a transaction process is performed using line of sight of the character, shown either from a third person or a first person perspective.

In particular, a user, by providing user input, can change the displayed view of the three dimensional computer generated environment to place the billboard or other virtual object into the displayed view. The view may be through the eyes (first person perspective) of the character or the view may show at least part of the character (third person). A menu is provided to the user when the billboard 120 is in the line of sight of the user or character. As shown in FIG. 8, the billboard 120 is in the view displayed to the user.

Performing a virtual transaction based on line of sight may be used in addition or alternatively to using a transaction area. In some embodiments, a transaction area may be generated such that both the user or character has to be in the transaction area and the virtual object must be in the line of sight before the menu is provided.

In some embodiments, the virtual transaction may be performed by a user from a shop user interface, for example, an in-game website or a menu. The shop user interface includes options specific to the retail environment. The shop user interface may be launched based on user behaviour, for example, in response to one of: a user controlling their character to enter a transaction area, enter a retail environment or viewing of a billboard.

At stage 108, a real-world transaction process is performed. The real-world transaction process is associated with the physical item. The real-world transaction process is performed in response to performing the virtual transaction process. In the present embodiment, the real-world transaction process is a purchase of a real-world item. The real-world transaction process is performed automatically in response to performing the virtual transaction process.

To complete the real-world transaction, the computing apparatus 30, together with the computing resource of the item provider and optionally the computing resource of the bank or financial institution, perform one or more transaction processing steps. The transaction processing steps include, for example, verifying user details, checking available funds, checking available stock, authentication payment details.

In the present embodiment, the computing apparatus 30 communicates with the one or more further computing resources 50 which include the computer resource associated with the item provider (for example an online merchant server) and a computer resource associated with a payment institution (for example a server hosting a user's bank account). The computer resource associated with the item provider may also be referred to as a provider server. The computer resource associated with the payment institution may also be referred to as an account server.

In the present embodiment, the computing apparatus 30 registers the virtual transaction process that has occurred in the computer generated environment and this is communicated over the network with provider server. The computer resource 30 generates an order signal that is representative of an order request for the item. The order signal includes order data representative of the order request for the item. The order signal may also include identification data of the user.

The order signal is sent over the network to the provider server and an authentication process is carried out through one or more authentication steps that are performed on the identification data of the user.

In some embodiments, the authentication process is performed using communication signals between the provider server and the computing apparatus 30. In some embodiments, the authentication process is performed using communication signals between the provider server, the computing apparatus 30 and the account server. In further embodiments, further network resources are involved in the authentication process, for example, resources associated with one or a credit and/or debit account.

In some embodiments, the user is prompted for further identification data in response to performing the virtual transaction. In particular, a request signal is received by the computing apparatus 30 from the provider server or account server, the request signal representing a request for further identification data that is needed to complete the authentication process.

In the present embodiment, a user performs the virtual transaction and an order signal is transmitted over the network. The order signal includes order data relating to the order. The order signal also include payment data relating to payment details of the user, for example, card identification number, card expiry data, user identification.

As part of the authentication process, the provider server processes the order signal and sends the payment data to the account server for authentication.

The authentication process includes sending a reply signal back to computing apparatus 30 prompting the user to input further identification data. The reply signal may be directly sent from the account server or from the provider server. The further identification data may include a password. The processor 32 caused the display apparatus 20 to display a request for further identification data. The request for further identification data appears as part of an in-game menu or pop-up dialogue box.

Once entered, the identification data is sent back to the account server to be processed. If the identification data is successfully authenticated, then the virtual transaction has been successfully performed and the corresponding amount of money will be exchanged. Following successful authentication, one or more completion signals will be sent from the account server to the provider server and/or the computing resource 30.

Signals between different computing resources described in the above embodiments are secured, typically through an encryption process. Different levels of security may be applied to different signals. For example, signals containing sensitive user details and payment information may be made more secure than signals containing only item information.

In some embodiments, the authentication process of a user and associated identification details include more than one signals being transmitted between the computing apparatus, the provider server and the account server.

In some embodiments, following authentication, a response signal is sent to the computing apparatus 30 from the provider server. The response signal includes status information about the order, for example, if the order has been successful or not. The response signal is processed by the computing apparatus 30 to provide the user with information about the status that is displayed on display apparatus 20.

In the above described embodiments, an order signal is sent from the computing resource 30 and relayed by the provider server to the account server. In other embodiments, the authentication process includes the computing resource 30 sending a first order signal to the provider server and a second payment signal to the account server.

If the order is authenticated successfully, the response signal include confirmation of the order which is notified to the user. If the order is not authenticated successfully, the response signal includes information about the unsuccessful authentication, for example, lack of funds, unsuccessful identification, lack of stock.

Confirmation or refusal information is notified via the display, for example, via a pop-up box or dialogue notification and/or by email. In some embodiments, the response signal contains further information about the item order. As non-limiting examples, the further information includes, delivery date, delivery address, collection data, collection address, pricing information, invoicing information. In cases of unsuccessful virtual transactions, the further information includes, for example, error message or order status.

As part of a successful virtual transaction, a suitable medium of exchange is exchanged. In some embodiments, the virtual transaction is performed using real-word currency. In some embodiments, the virtual transaction is performed using an in-game currency. In some embodiments, the currency used is based on in-game performance, for example, a user or their character can earn in-game currency. In some embodiments, the in-game currency can be exchanged between users of the game. In some embodiments, the currency used is a digital currency, for example a cryptocurrency.

In the above described embodiments, a user is prompted for further identification data, for example, a password, during game-play. In some embodiments, users may have an in-game account that stores in-game credit and any virtual transactions are debited against said in-game account. In some embodiments, the in-game account is a pre-pay account, where a certain value of in-game credit is bought by a user during a transaction that is separate to the virtual transaction.

In some embodiments, the in-game account is linked to a user's credit or debit account and the user pre-authorises virtual transaction such that further identification data is not required and the user is not prompted for such data. Therefore, the user experience of a virtual transaction is substantially seamless and without any interruption. Virtual transactions may be pre-authorised up to a certain pre-determined value and the transaction process may include a comparison process between the value of the virtual transaction and the pre-authorised value.

In some embodiments, in game currency is used which has been previously bought using real-world currency.

Following successful completion of the real-world transaction, the physical item is provided to the user in the real-world, for example, by delivering the item or making available for collection.

The virtual object is also made available for use in the three dimensional computer-generated environment in response to completion of the real-world transaction. As described above, the virtual item may have functionality in the computer-generated environment and/or one or more properties of the computer-generated environment may be modified in response to completing the virtual transaction.

In the described embodiments, a virtual object associated with physical items available outside the game world are described. It will be understood that a virtual object may also be associated with services provided by a service provider. These services correspond to services available outside the game world, for example, services in the real-world.

In some embodiments, retailers associated with the provided retail environments, can provide tailored offers to users of the game. These may be presented on billboards or other suitable locations in the three dimensional environment. Offers may be generated automatically based on a user in-game and/or real-life profile. Tailored offers may be provided as image data that is projected onto one or more display areas in the three-dimensional environment, substantially as described with reference to the method of FIG. 12.

In some embodiments, the images projected at the image display area are different for different users such that each user is provided with a different offer when looking at the same display area. In such embodiments, the data and instructions used to generate the three dimensional environment are common between the users are retrieved from game server of shared further computing resource 72 but the image data for each user may be retrieved from different data servers.

Figure 9:
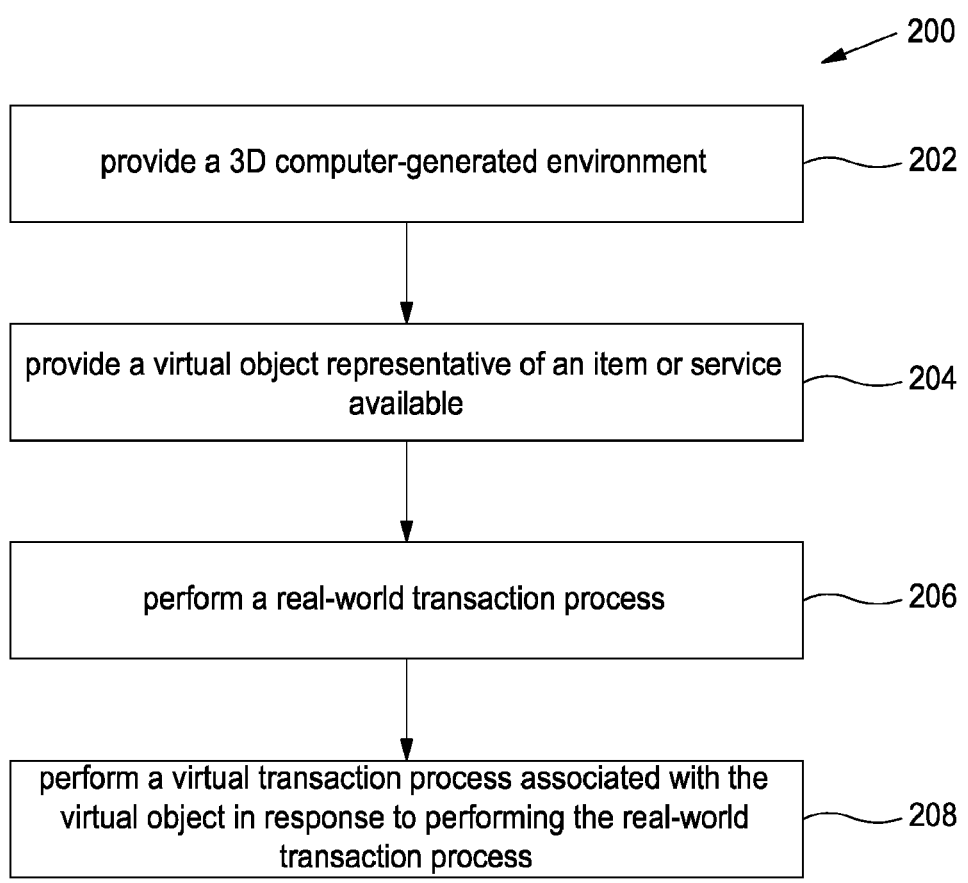
FIG. 9 is a flowchart illustrating in overview a method of an embodiment comprising performing a virtual transaction.

FIG. 9 is a flow chart illustrating in overview a method of performing a real-world transaction, for example, a purchase of a real-world object, via the computer-generated environment, in accordance with embodiments. As in FIG. 3, the further computing resource 50 is associated with an item and/or service provider and is substantially as described with reference to FIG. 3. In particular, the further computing resource 50 may include one or more further computing resources.

In the present embodiment, the further computing resource 50 include a computer resource associated with the item provider.

The initial two stages of the method of FIG. 9 (stage 202 and stage 204) are substantially the same as the corresponding stages of the method of FIG. 3. In particular, at stage 202 a three dimensional computer-generated environment is provided, substantially as described for stage 102 of method 100. In addition, at stage 204, a virtual object representative of an item or service available is provided in the computer-generated environment, as described for stage 104 of method 100. As in the method of FIG. 3, the virtual object is representative of an item that is available in the real-world.

At stage 206, a user performs a real-world transaction process in association with the item in the real-world. In the present embodiment, the real-world transaction process is performed by a user in a shop or other retail environment in the real-world. The real-world transaction process is a purchase of a physical tangible object.

As part of the real-world transaction process, a unique identifier is generated by a computing resource associated with the item provider. The identifier comprises transaction identification data that is verifiable. In some embodiments, the transaction identification data is in the form of an identification code. The generation of the unique identifier is triggered by the completion of the real-world transaction, for example, by a signal from a computing resource at the shop location.

At stage 206, the transaction identification data is also electronically stored to be retrieved by the computing resource 30. The data is stored by a computing resource associated with the item provider or forwarded on and stored by a game server, for example, under a user account. In the present described embodiment, the data is stored at a game server that is hosted at the shared further computing resource 72, however, it will be understood that it may be stored elsewhere.

At stage 208, a virtual transaction process associated with the virtual object is then performed by the user in the three dimensional computer generated environment. A user can perform the virtual transaction process substantially as described with reference to the virtual transaction process of method 100. In addition to those described features the virtual transaction process of FIG. 9, the virtual transaction process at stage 208 also includes a step of verifying the transaction identification data.

In the present embodiment, the user is prompted to provide the transaction identification data. The user then enters user input data representative of the transaction identification data which is processed by the computing resource 30 and verified against the identification data stored at the game server. Verification can take place either at the computing resource or at the game server. It will be understood that depending on where the verification takes place, the verification process can include transmitting the user input data to the game server (of shared further computing resource 72) or retrieving the transaction identification data. A comparison step is then carried out to compare the transaction identification data and the user input data. Verification can be performed through signals sent between computing apparatus 30 and shared further computing resource 72.

In some embodiments, the identifier representing the transaction identification data is in a graphical and computer readable form, for example, a bar-code or a QR code. The such embodiments, the user can input the transaction identification data via the portable device 60. In some embodiments, the portable device is a smart device with a camera or a scanner. In other embodiments, any suitable device configured to read a graphical representation of the data may be used. The portable device 60 may receive transaction identification data via a companion application being run on a processor of the portable device.

To complete the virtual-world transaction, the computing system 30, together with one or more further computer systems must process the transaction. This processing includes, for example, verifying transaction identification data from the real-world transaction and/or user details.

In some embodiments, the user is prompted for further identification data in response to performing the virtual transaction. In particular, a request signal is received by the computing resource 30 from the shared further computing resource 72 for further identification data needed to complete the verification process.

In some embodiments, the verification process of a user and associated identification details include more than one signals being transmitted between provider server and the computing resource 30.

In some embodiments, following verification, a response signal is sent to the computing apparatus 30 from the provider server. The response signal includes status information about the verification, for example, if the verification has been successful or not. The response signal is processed by the computing apparatus 30 to provide the user with information about the status to be displayed on display apparatus 20.

If the order is verified successfully, the response signal include confirmation of the order which is notified to the user. If the order is not verified successfully, the response signal includes information about the unsuccessful verification, for example, incorrect an incorrect match of identification data.

Confirmation or refusal information is notified via the display, for example, via a pop-up box or dialogue notification, and/or by email. In some embodiments, the response signal contains further information about the item order.

As part of a successful real-world transaction, a suitable medium of exchange is exchanged. In some embodiments, the real-world transaction is performed using real-word currency. In some embodiments, the real-world transaction is performed using an in-game currency. In some embodiments, currency used is based on in-game performance. In some embodiments, the in-game currency can be exchanged between users of the game. In some embodiments, the currency used is a digital currency, for example a cryptocurrency.

In embodiments described above, a user is prompted for identification data during the verification process. In other embodiments, the verification process is automatically performed. In some embodiments, the real-world transaction is recorded in a memory, for example a memory resource of the game server of the further shared computing resource 72, and is linked to user details, for example, to a user account. In such embodiments, the verification process as part of the virtual transaction process includes checking the recorded transaction and no further input from the user is required for verification.

In some embodiments, the verification process includes the step of establishing that the user is controlling the character that is perform the virtual transaction. This can be based on a comparison between current character behaviour and historical character behaviour. Alternatively, a user may have already previously verified themselves when logging on to play the game, through a password or other method. By automatically verifying the transaction without further prompting to the user, interruption to the gaming session may be reduced.

In some embodiments, in game currency can used which has been previously bought using real-world currency or vice-versa.

Following successful completion of the virtual transaction, the virtual item is provided to the user for use by their character in the virtual world. As described above, the virtual item may have functionality in the computer-generated environment and/or one or more properties of the computer-generated environment may be modified in response to completing the virtual transaction.

In further embodiments, one of more virtual features are made available in the three dimensional computer generated environment in response to performing the virtual transaction. These virtual features may be part of the virtual environment or gameplay features. As non-limiting examples, virtual features include game modes, missions, parts of the virtual environment, for example, specific locations, characters.

In the above described embodiment of method 200, the real-world transaction process is described as occurring in a shop or other retail environment in the real-world and the real-world transaction process is a purchase of a physical tangible object. In other embodiments, the real-world transaction process refers to a transaction carried out by a user online, for example, on a third party website accessed using a browser. In some embodiments, the real world transaction could be performed over the internet using the further portable device 60. In some embodiments, the real-world transaction process refers to any transaction process that is performed outwith the three dimensional computer generated environment.

In such embodiments, the further computing resource 50 is a server associated with a third party on-line retailer and the real-world transaction process includes placing an order for the physical item or service from the third party on-line retailer.

As part of the real-world transaction process, a unique identifier is generated by a computing resource associated with the item provider. The identifier comprises transaction identification data that is verifiable. In some embodiments, the transaction identification data is in the form of an identification code. The generation of the unique identifier is triggered by the completion of the real-world transaction, for example, by a signal from a computing resource at the shop location.

In the above described embodiments, the identifier is redeemable in the three dimensional environment. In further embodiments, the identifier is redeemable in one or more further platforms or environments that are accessible to a user via the three dimensional environment.

It will be understood that described embodiments of method 100 and described embodiments of method 200 will have common features, and features described with reference to one method may be implemented with features of another method in any suitable combination.

In accordance with embodiments, purchases can made from a 3.sup.rd party website where the user is provided a code or some other redeemable token that can be entered in to a specific platform, for example, entering a code for PSN/Xbox Live/Steam after receiving it as part of ordering the physical product from a retailer or 3.sup.rd party.

In some embodiments, the real-world transaction process and virtual transaction processes are performed by different users, for example, a user may perform the real/virtual transaction process and send the resulting real-world product/virtual product/identifier to another user by communicating in the real-world or in the three dimensional computer generated environment.

Figure 10:
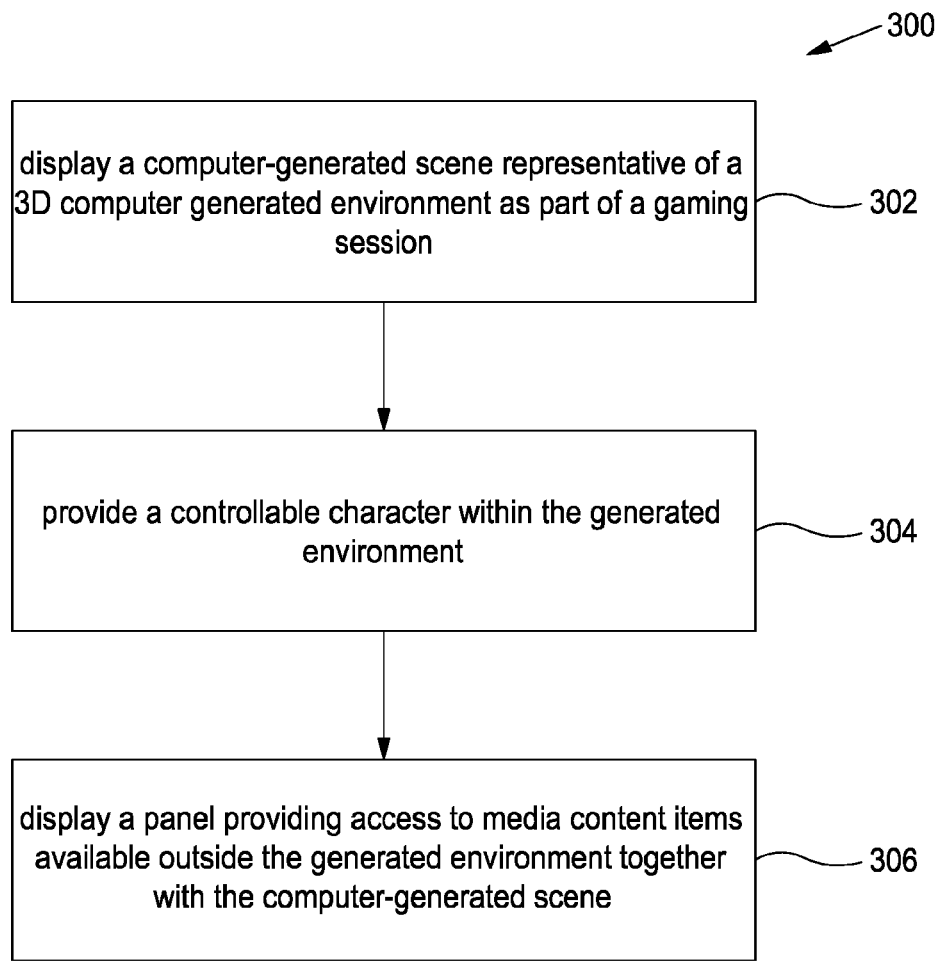
FIG. 10 is a flowchart illustrating in overview a method of an embodiment comprising displaying media content items via a panel.

FIG. 10 is a flow chart illustrating in overview a method 300 of an embodiment. For the method 300, the further computing resource 50 comprises computing resources associated with one or more media content providers. In the present embodiment, the further computing resource 50 comprises a plurality of data stores accessible via a network. The plurality of data stores comprises respective memory resources for storing image, audio and/or video data.

As in the previously described embodiments, the processor 32 (for example the environment circuitry) generates the three dimensional environment.

At stage 302, the computing apparatus 30 sends display information representative of a computer-generated scene of the three dimensional computer generated environment to the display apparatus 20. At stage 302, the computer generated scene is displayed on the display apparatus 20 to be viewed by the user. The computer generated scene is provided as part of a gaming session for the user.

Stage 302 includes displaying the computer generated scene. In some embodiments, stage 302 represents more than one processing step that is performed by processor 32 prior to or after the displaying step. These processing steps include modelling the three dimensional environment and rendering the computer generated scene to be displayed. Modelling includes modelling both structural elements of the environment and objects within the environment.

At stage 304, as described with reference to the methods of FIGS. 3 and 9, the controllable character is provided within the three dimensional environment. As described with reference to the method of FIGS. 3 and 9, the scene displayed by the display apparatus 20 may include a representation of, at least part of, the character, or the scene may substantially correspond to a viewpoint of the character.

At stage 306, a panel is displayed that provides access to media content items that are available outside the three dimensional computer generated environment i.e. outside the gaming session. In some embodiments, at least one of the media content items are stored on the data stores accessible via a network. In some embodiments, at least one of media content items is stored on the memory 34 of the computing resource itself.

The panel may be referred to as an augmented video player.

The panel is displayed on display apparatus 20 together with the computer-generated scene such that the media content items and computer generated scene are displayed simultaneously. The panel is displayed on display apparatus 20 as part of the gaming session of the user. Media content items usually available only outside of the gaming session are made available to a user inside the gaming session.

Figure 11:
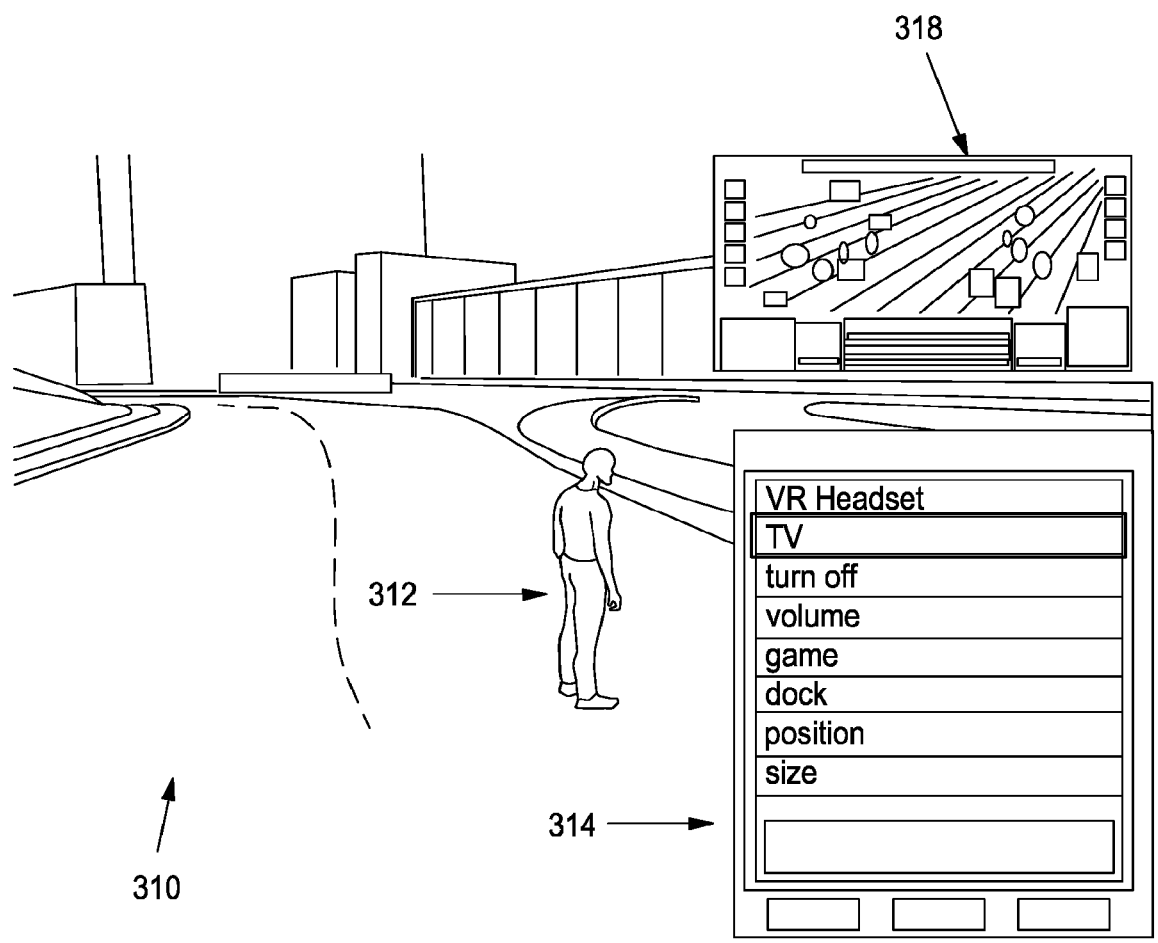
FIG. 11 is an illustration of a screen shot representative of a panel displayed together with a computer generated scene.

FIG. 11 shows an illustration of a screen capture from display apparatus 20. The image shows a computer generated scene 310 of the computer generated environment provided as part of a gaming session. In this image, the scene 310 is a scene of a street in the three dimensional environment i.e. the environment includes structural elements and objects representative of a street, including pavement, rods, street furniture. The controllable character 312 is also rendered as part of the scene.

An interactive menu element 314 is provided that can be navigated by a user by providing user input data to the computing resource 30 via the user input device 40. In some embodiments, the character is controlled using a first input device, for example, user input device 40, and the interactive menu element is controlled using a second input device, for example, portable device 60. The interactive menu element may be controlled via a companion application running on a processor of the portable device 60.

In some embodiments, the interactive menu element 314 forms part of, or is the same as, the menu 118 described with reference to FIG. 6.

The image shows a panel 318 that provides access to media content that is available outside the computer-generated environment. An option to display the panel 318 is provided as part of the menu element 314. The menu element 314 also has options that allow a user to select which media content items are to be displayed. As can be seen in the image, the panel 318 overlaps the computer generated scene. In this embodiment, the game session is provided in a first display container, for example, a window, and the panel is provided inside the same display container. The container window may be sized to substantially fill display 22.

The media content items are retrieved from one of the plurality of data stores of further computing resource 50. In some embodiments, the media content items are provided by one or more media content service providers. As described above, in some embodiments the further computing resource 50 is representative of one or more content delivery networks comprising a distribution of servers and data centres such that media content items are retrieved or streamed from the one or more content delivery networks. Content delivery networks may also be referred to as content distribution networks. In embodiments using content delivery networks, issues regarding streaming are handled remotely by the content delivery network.

In the present embodiment, the one or more media content items are obtained from computing resource 50 that is remote from the game server of shared further computing resource 72. Method 300 can include the stage of retrieving game data for performing stage 302 from the game server and retrieving the media content items from the computing resources remote from the game server to perform stage 306.

In some embodiments, one or more priority attributes are assigned to the streaming content and to the processing steps associated with generating and displaying the computer-generated environment including retrieving data for generating the environment from a further processing resource.

In some embodiments, a user may move to a new area of the three dimensional environment that requires further data to be retrieved from a non-local computer resource via a network. In such an embodiment, retrieving said data is given priority over the stream of media content for the display panel.

In some embodiments, other processes not including streaming or gameplay processes that are active on the processor 32 are monitored and processing resources allocated and/or shared between processes based on said monitoring. By sharing processes the processor 32 may provide an optimal experience to the user.

Method 300 may include the further steps of assigning a priority attribute to the retrieval of media content items and to one or more processing steps associated with generating and displaying the computer generated scene and the further step of evaluating a priority of the stream and the computer-generated scene and adjusting one or more properties of the game and scene based on the evaluation. Streaming and game networking properties may be adjusted dynamically. For example, one or more properties related to the download or streaming of game data from the game server and media content items from the data stores can be adjusted.

In this embodiment, media content is streamed or otherwise displayed via the panel. While the media content is displayed via the panel, a user can continue to control the character in the three dimensional computer generated environment. The character is controlled by receiving user input and user input can be received while the panel is displayed.

In some embodiments, the panel is controllable and/or adjustable by a user. The computing resource 30 receives one or more user inputs indicative of panel control.

User input device 40 provides panel control data to the computing apparatus 30 and processor 32 processes panel control data.

The panel may be controlled by a user providing user input via the user input device 40 or by the portable device 60. Alternatively, or in addition, the panel may be controlled or adjusted automatically by computing resource 30.

Control of the panel may be described as a number of control functions, in accordance with embodiments.

A first control function is to display the panel itself.

A further control function is selection of a media content item to be displayed. Options may be presented in the display panel itself, via the menu element.

A further control function is to select or modify the location of the panel. The location may be selection relative to the display container (for example, top right, top left) or relative to the computer-generated scene.

A further control function is to select an arrangement of panel and computer-generated scene. Example options include: overlapping, overlaying, side by side.

A further control function is to select or adjust one or more properties of the panel. These can be properties associated with how the panel is displayed, for example, one or more of size, position, shape, opacity, transparency, colour, contrast, brightness. The properties may be associated with sound of the media content displayed on the display, for example, the volume may be selected.

The position of the panel from a pre-set position may be changed. A default position may be the top left hand corner but the panel can be moved by a user to any other position on the screen. The position of the panel may be adjusted automatically by the processing resource based on the game environment. The panel position or other properties may be adjusted in response to a user controlling a character to move from a first environment, for example, an interior environment, to a second environment, for example, an exterior environment.

In some embodiments, different locations of the computer-generated environment have location dependent panel property profiles such that when a user controls their character to visit said location or an area marked out about said location, the property panels are modified to match the location dependent panel property profile.

A further control function includes adjusting one or more properties of the display panel relative to one or more corresponding properties of the computer generated scene thereby to emphasise or de-emphasise the displayed panel relative to the computer-generated scene. This may comprise changing size or other display or sound properties of one or both of the computer generated scene and display.

A further control function includes re-sizing the panel. The panel may be resized, for example, enlarged or shrunk. The panel may be resized to full-screen mode such that the panel is sized to substantially fill display 22. The panel be minimized such that the panel is no longer visible to a user.

In some embodiments, one or more of the above control functions is performed by the computing resource 30 automatically. The control function may be performed in response to an event in the three dimensional environment, or a change in three dimensional environment. In some embodiments, the control function is performed based on a determined value of a display or sound property of the computer generated scene. As non-limiting examples, display or sound properties of the computer generated scene that are used to trigger control functions include brightness, colour, sound volume, viewpoint.

As a non-limiting example, if the volume generated by the computer generated scene is increased, due to, for example, a nearby action occurring in the computer generated environment, the volume of the media content displayed in the panel is increased. In some embodiments, the adjustment of the property of the panel is simultaneously performed with an adjustment of the property of the computer generated scene. In this example, the increase in volume for the panel is performed at the same time as a decrease in volume for the computer generated scene.

In some embodiments, one or more of the above control functions is performed by the computing resource 30 automatically based on an environmental condition of the three dimensional computer generated environment. As non-limiting examples, display of the panel may be controlled based on one or more of: weather conditions, lighting conditions, sound levels, time of day, location in game world.

In some embodiments, one or more of the above control functions is performed by a computing resource automatically based on an action or event occurring in the three dimensional environment. The action may involve the character. For example, the display of the panel may be controlled based on a mode of transport of the character or speed of movement of the character.

As a non-limiting example, an event in the computer-generated environment triggers a change in a display property of the panel. The event could be selection of a gameplay mode or entering a mission. The opacity of the panel is then reduced. This may reduce the distraction of the panel.

As a further non-limiting example, the panel may be minimized in response to starting a mission or other game mode. For example, a mission may be initiated by a third party player. By minimizing the panel, a focus of a user may be modified and distraction may be decreased.

In some embodiments, one or more of the above control function is performed based on received user input via the user input device 40. In some embodiments, one or more stored panel property profiles are presented to the user for selecting.

In some embodiments, the panel includes a control panel. The control panel may be displayed as part of the panel or as a separate display element. The control panel is controllable based on user interaction. The interactive menu element, described above, may be provided as part of the control panel or the control panel may be provided as part of the menu element.

In further embodiments, the panel is displayed on display apparatus 20 which acts as a main display, together with the scene of the computer-generated environment and the control panel is provided on a screen of portable device 60. The control panel may be provided as part of a companion application executable on a processor of portable device 60, the companion application being downloadable. In these embodiments, a user can control the panel with a companion application running on a processor of the portable application.

In these embodiments, the portable device 60 can communicate with the computing resource 30, either directly or indirectly via a network such that a selection of media content on the further user input device is communicated to the computing resource 30 and displayed via the display apparatus 20.

The companion application and portable device 60 operate to introduce external content in to the game thereby providing the player with a browsing experience on the portable device 60 and displaying selected media in the game.

In further embodiments, a user can switch content from the panel of the display apparatus 20 to the screen of the portable device 60. This can be performed through user interaction with the portable 60 or the user input device 40.

In some embodiments, the one or more processing steps related to generating and displaying of the computer generated environment (stage 302) may be switched to a lower resource mode in response to displaying the panel. In further embodiments, further fine tuning of computing resources is provided based on panel properties and/or environment properties.

In some embodiments, other arrangements of panel and computer generated scene are possible, including, side by side and overlay.

In further embodiments, a user can produce one or more lists, hereby referred to as playlists, of content items to be queued and played. Playlists can be made by a user and stored on the computing resource 30. In other embodiments, playlists can be created on an external platform, and retrieved by a user. Playlists may be created on portable device 60 and imported into the game session.

In some embodiments, playlists are queues comprising media content items that are to be obtained from a plurality of different media content platforms. When executing the playlist, the computing resource obtains the media content items from these externally hosted platforms. In some embodiments, a user can create a queue of media content items that includes externally hosted media content items (hosted on one or more further computing resource, for example, the plurality of data stores) and locally hosted media content items, for example, memory 34.

As non-limiting examples, media content items can include videos, images, video stream, books, documents, video games, multi-player video games, recorded or live streams, video streams of video games, social media content, advertising. Media content items can be launched via a graphical user interface, for example a graphical user interface of a media content provider, that is displayed on and controllable via the control panel.

Figure 12:
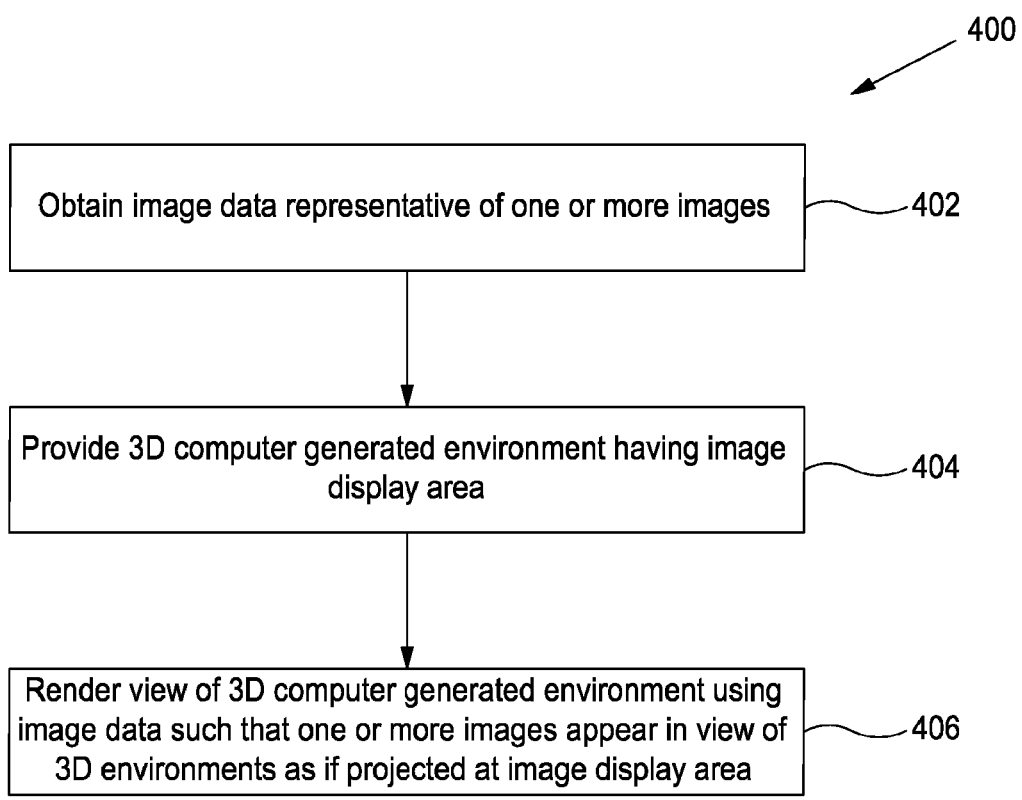
FIG. 12 is a flowchart illustrating in overview a method of an embodiment comprising displaying media content items in an three dimensional computer generated environment.

FIG. 12 is a flow chart illustrating in overview a method 400 of an embodiment. For the method 400, as described with reference to method 300, the further computing resource 50 is associated with one or more media content providers. For this method, the further computing resource 50 comprises a plurality of data stores accessible via a network. The plurality of data stores comprises respective memory resources for storing image, audio and/or video data. In the present embodiment, further computing resource 50 is provided separately from game server hosted on shared further computing resource 72.

At stage 402, the processor 32 obtains image data that is representative of one or more images. The image data is retrieved from the plurality of data stores. In some embodiments, the image data is additionally or alternatively obtained from a local memory resource, for example, memory 34.

In the described embodiment, the images form part of a video sequence. The image data is therefore representative of a sequence of video frames such that, when displayed in their intended sequence, the sequence of video frames are displayed as a moving video. The video sequence may be characterized by a video frame rate. A typical frame rate for streamed video is for example, 24 frames per second or 30 frames per second.

Figure 13:
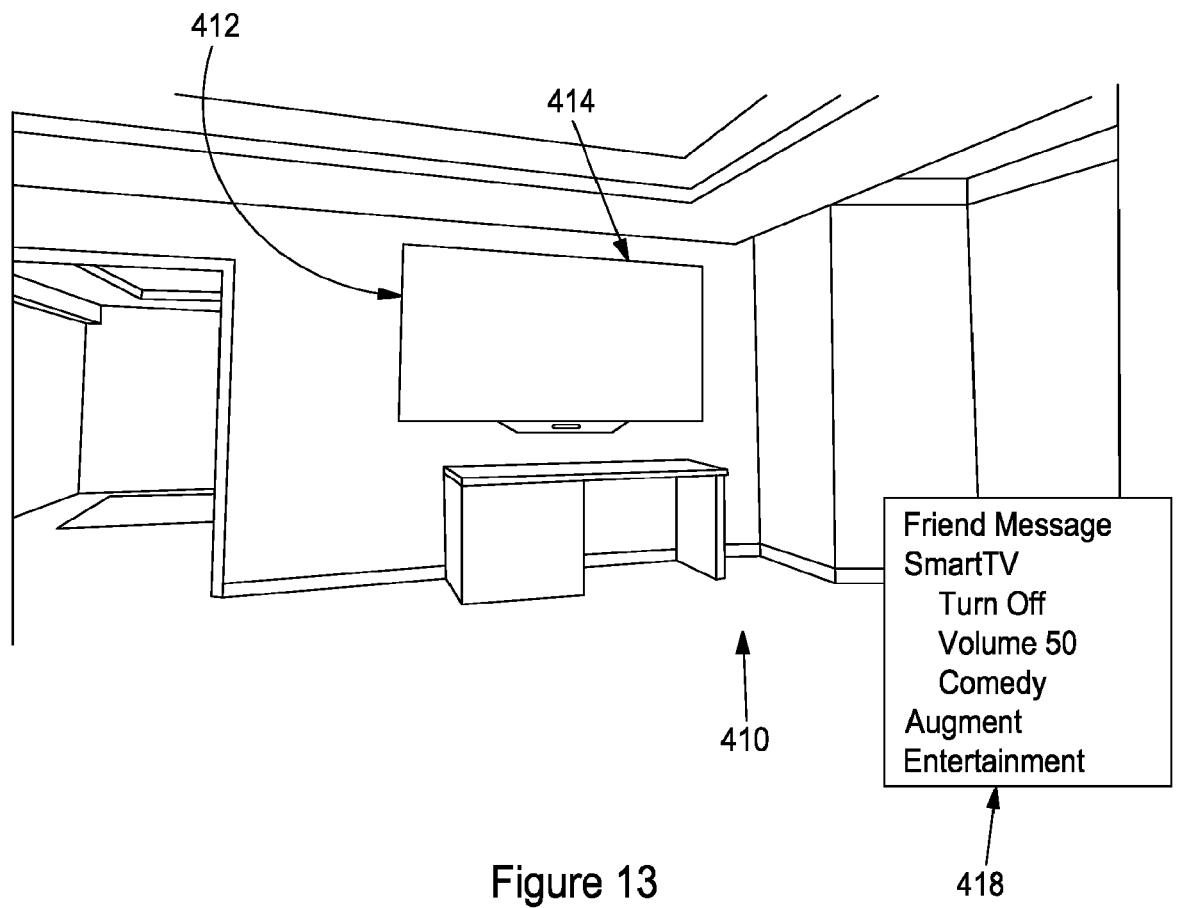
FIG. 13 is an illustration of a screen shot representative of a display area in a computer generated scene.

At stage 404, as described with reference to other embodiments, the processor 32 (for example the environment circuitry) generates and provides the three dimensional computer generated environment. The three dimensional computer generated environment includes an image display area. FIG. 13 shows an illustration of a screenshot showing a view 410 of the three dimensional computer generated environment. The environment is representative of an interior environment, in this example, a bedroom. The environment has a number of virtual objects inside, including a television 412.

An image display area 414 is indicated in FIG. 13. The image display area 414 substantially corresponds to the area of the television 412 inside the bedroom such that any images displayed in the image display area 414 appears as if displayed on the television 412. In some embodiments, the image display area is aligned and/or coincides with the area of the virtual object.

Turning back to the method of FIG. 12, at stage 406, a view of the three dimensional environment is rendered using the image data. Rendering of the view includes performing one or more rendering processing steps, for example, by graphics processing unit 36. The view is rendered such that it appears as if the one or more images represented by the images are projected at the image display area in the computer-generated environment. FIG. 13 shows an image projected at image display area 414 as if image were displayed on television 412.

Rendering of the view includes determining at least one of geometry, texture, lighting, shading and shadow of the image display area.

In some embodiments, the stage 406 of rendering the view includes the further steps of determining a compensation mapping based on at least one of at least one property of the image display area, an environmental condition and/or a viewing angle of the rendered view. The compensation mapping is then applied to the image data to produce compensated image data which is then used when rendering the view.

The compensation mapping may include changing one or more properties of the image data. For example, one or more of colour, contrast or brightness may be modified by the compensation mapping.

As a first non-limiting example, one or more structural elements of the environment may project a shadow over the image display area in certain lighting conditions. The compensation mapping modifies the brightness or colour of the image data such that, when projected at the image display area, the image appears as if in shadow.

As a second example, a user may view the image display area at an angle that is not perpendicular, for example, from above, below or sides. The viewing angle of the image display area may have a value between 0 and 180 degrees. The colour, contrast or brightness is modified based on viewing angle.

In some embodiments, the method further comprises modelling the three dimensional computer generated environment to produce a model. As the three dimensional environment contains an image display area, the model also has an image display area. To render the view, textures are obtained from a texture server and applied to the model.

Image data is processed to produce an image data texture. The image data texture may be produced by the processor 32 or may be supplied to the processor from a further computing resource, for example, from the game server of shared further computing resource 72. The image data texture is then applied, together with other textures, by the processor 32 (for example by texture circuitry) to the image display area of the model.

As shown in FIG. 13, the image display area 414 is provided on the surface of a virtual object, for example, a television 412. The image display area 414 can form part of a surface of a virtual object or may be provided on a virtual object. Non-limiting examples of virtual objects that provide suitable surfaces for image display include: a display or screen, a bill-board, a television, a monitor, a mobile phone, a tablet, a watch. In addition, surfaces of structural elements of the virtual environment may be suitable, for example, a wall or a road.

In the embodiments described above, the image display area is a substantially flat surface. It will be understood that different shapes of image display area, for example, curved, are possibly with suitable compensation mappings. In further embodiments, the image display area comprises a volume of the computer generated environment and the image data is rendered are displayed to appear as a virtual hologram in the computer generated environment. In some embodiments, the user can move round the virtual hologram and view the virtual hologram from different sides.

Prior to displaying the image data at the image display area, in some embodiments, one or more processing steps are performed on the image data in dependence on one or more properties of the computer-generated environment. Such properties include, a property of the image display area, an environment condition of the environment or a viewing or a viewing angle or position of the rendered view.

In some embodiments, the three dimensional computer generated environment is displayed at a game resolution while the obtained image data represents one or more images having an image resolution. In some embodiments, the image data is processed by the processor 32 such that the image appears displayed in the computer generated environment at the game resolution.

In some embodiments, content of a video stream is provided by the further computing resource 50 at more than one resolution and the processor 32 selects which resolution to receive based on the game resolution. The selection may be based on a suitable selection rules, such as, select the video stream with resolution closest to the game resolution.

In the present embodiment, game data for generating the three dimensional environment and associated gameplay is stored and retrieved from a first server (the game server of shared further computing resource 72) and image data for displaying images at the display area is stored and retrieved from a second server (one of the plurality of data stores of computer resource 50). In the present embodiment, the first and second servers are physically separate servers.

In the present embodiment, the one or more media content items are obtained from computing resource 50 that is remote from the game server of shared further computing resource 72. Method 400 can includes the further stages of retrieving game data for performing stage 404 from the game server (of shared further computing resource 72) and retrieving the media content items from the computing resource 50 remote from the game server to perform stage 402.

In some embodiments, the first and second servers are virtual servers hosted on the same resource at the same physical location.

It will be understood that features described with reference to the video panel embodiments as described with reference to FIGS. 10 and 11 can be applied for display area embodiments as described with reference to FIG. 12 and vice versa. As a non-limiting example, interactive menu element 418 is provided, which is the same or at least similar to interactive menu element 314.

In further embodiments, a control panel for controlling the content and/or properties of the image display area may be provided as part of a companion application executable on a processor of portable device 60, the companion application being downloadable. In these embodiments, a user can control the display area using the companion application.

In these embodiments, the portable device 60 can communicate with the computing resource 30, either directly or indirectly via a network such that a selection of media content on the further user input device is communicated to the computing resource 30 and displayed via the image display area.

In further embodiments, a user can switch content from the display area of the display apparatus 20 to the screen of the portable device 60. This can be performed through user interaction with the portable device 60 or the user input device 40.

In a further embodiment, an audio source area, that may be associated with the image display area, is also provided in the three dimensional environment. In the following described embodiment, the audio source area substantially corresponds to the image display area (e.g. the audio source area and the image display area correspond to a television as described above). The processor 32 obtains audio data associated with the image data. In this embodiment, the audio data is representative of audio of a video and the image data is representative of image data of a video. The audio and image data are retrieved from the further computing resource 50.

The processor 32, for example, the audio processing circuitry 38, then performs an audio rendering process using said retrieved audio data or data derived therefrom. The audio rendering process includes one or more audio processing steps. The audio rendering process provides output audio data resulting from the audio rendering process to the display apparatus 20 to be output as output audio by the speaker 24. The output audio accompanies the render view displayed by display apparatus 20.

The audio rendering process is performed so that the at least part of the produced output audio sounds as if it is being produced at the audio source area. In the present embodiment, the produced output audio has two elements: a first audio element that corresponds to ambient sound of the three dimensional environment, including sound effects and other background noises and a second audio element that corresponds to the audio data of the video. The produced output audio is a mix of at least the first and second audio elements. The elements may also be referred to as channels. The audio rendering process includes processing the audio data of the video such that the second audio element sounds as if it being produced as the audio source area. Hence, the rendered view displayed to a user and accompanying audio broadcast to the user gives the user the impression that the video is being played at the image display area.

The audio element from the audio source area may be such that is has a spatial distribution, such that at different places in the three dimensional environment the outputted audio is different. The audio element can be directional.

In other embodiments, the audio data is independent of the image data. For example, the audio data may be radio stream or podcast stream data. In such an embodiment, it will be understood, that the audio source area is independent of image display area. In some embodiments, the audio source area may correspond to a virtual object that produces sound and not images, for example, a radio or a speaker and no image data is retrieved.

In some embodiments, the audio source area is provided separately from the image display area. As a non-limiting example, the image display area is provided at a television and the audio source area is provided at a separate speaker. As a further example, the image display area is in the distance and the audio source area is a pair of headphones or a local sound source.

As described above, audio data is processed and broadcast so that the audio sounds, to a user, as if it is originating from the audio source area in the three dimensional environment. The audio rendering process includes performing one or more processing steps on the retrieved audio data. For example, the audio data is processed to modulate, amplify, dampen or otherwise modify the produced audio. The audio data may be processed such that the produced audio is occluded. The audio data may be processed such that relative levels or volumes of different audio elements are modified. In a non-limiting example, as a character is moved to be closer to an audio source area, the audio data is modified such that volume the corresponding audio element is increased and the volume of the other audio elements are decreased.

In some embodiments, the audio rendering process is based on a number of different factors. The audio rendering process may include one or more processing steps that are dependent on, for example, a change in environmental conditions, change in viewpoint, change in relative position between character and audio source area, change in image data, activity in the three dimensional computer-generated environment.

A number of non-limiting examples are provided in the following: the audio element is dampened in response to a user moving their character to be further away and/or facing away from the audio source (in the three dimensional environment); the audio element is dampened if a further object is positioned between the character and the audio source; the audio element is amplified if a user moves the character to be closer to or facing towards the audio source area; the audio source area may be moveable in which case the audio element is amplified or dampened in response to the audio source area moving towards or away, respectively, from the character.

In some embodiments, the audio rendering process takes into account one or more environmental conditions, for example, the acoustics of the environment.

Figure 14:
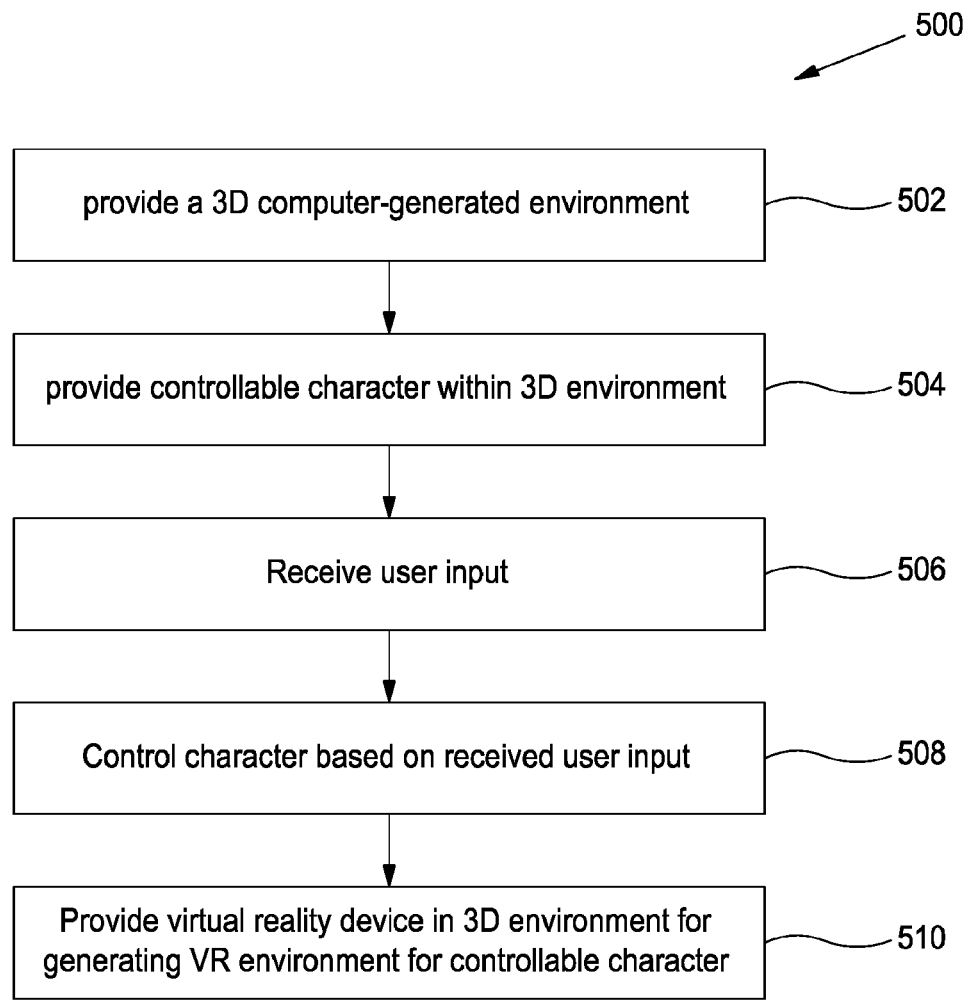
FIG. 14 a flowchart illustrating in overview a method of an embodiment comprising generating a virtual reality environment for a controllable character.

FIG. 14 is a flow chart illustrating in overview a method 500 of an embodiment. For method 500, the computing apparatus 30 is in communication with game server of shared further computing resource 72 and further computing resource 50.

Method 500 is a method of providing a second three dimensional computer generated environment that is accessible by a user from the first three dimensional computer generated environment. The second three dimensional computer generated environment may be referred to a virtual reality environment. A virtual reality device is provided in the three dimensional environment for generating the virtual reality environment for the controllable character. The virtual reality device provided in the three dimensional environment is a three dimensional computer generated virtual reality device. The virtual reality device may be considered as a virtual VR device.

As described in the following, the virtual reality environment is accessible by a user by controlling the in-game character to perform an interaction process with the virtual reality device.

Steps 502, 504 and 506 of method 500 correspond to previously described features, in particular, to features described with reference to FIG. 3, FIG. 9, FIG. 10 and FIG. 12.

At stage 502 of the method 500 the three dimensional computer-generated environment is provided, substantially as described with reference to other embodiments, for example, stage 102 of method 100, shown in FIG. 3.

At stage 504 of the method, substantially as described with reference to other embodiments, for example, stage 304 of FIG. 10, the controllable character is provided within the first three dimensional environment. As described with reference to other embodiments, the displayed view may include the controllable character or may correspond to a view point of the character. In some embodiments, a user may switch between the two views.

At stage 506, user input is received by computing apparatus 30 from the user input device 40. The user input is received and processed by processor 32 (for example by input circuitry). At stage 508, the processor 32 (for example the character circuitry) modifies the behaviour of the character based on the user input such that the character is controlled by the user providing user input.

At stage 510, a virtual reality device is provided inside the three-dimensional environment. The virtual reality device is configured to generate a virtual reality environment for the controllable character.

A further stage in the method includes a user controlling the character to perform an interaction process with the virtual reality device. In response to performing the interaction process, the processer 32 performs processing steps thereby to provide display data to the display apparatus 20 to display the virtual reality environment.

In the present embodiment, the virtual reality device is a three dimensional representation of a virtual reality helmet and the interaction process includes the character putting on the virtual reality helmet. The user input received at stage 506 is representative of an intention for the character to put on the virtual reality helmet. The user input is received and processed by processor 32 (for example by the input circuitry). The processor 32 (for example the character circuitry) then controls the character in the first three dimensional environment to put on the virtual reality helmet. In response to the character putting on the virtual reality helmet, the processor 32 (for example the virtual reality circuitry) generates the virtual reality environment and sends display data to display apparatus 20 to display the virtual reality environment on display 22.

A controllable character, which in some embodiments corresponds to the character of the first three dimensional environment and in other embodiments is a different character, is provided for a user to control in the virtual reality environment. In some embodiments, user input and control of the character in the virtual reality environment is substantially the same as user input and control of the character in the first environment (as described elsewhere). However, it will be understood, that control of the character(s) may vary between the two environments.

Figure 15:
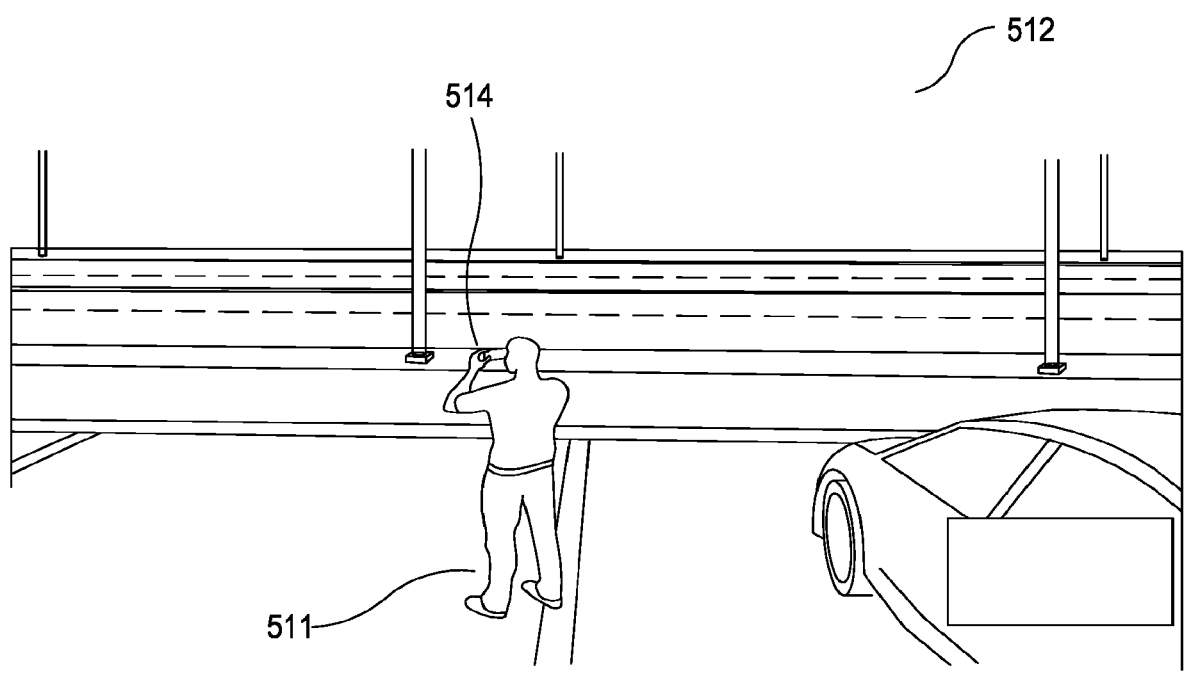
FIG. 15 is an illustration of a screen shot representative of a controllable character interacting with a virtual reality helmet in a three dimensional computer generated environment.

FIG. 15 shows an illustration of a screen shot, in which a controllable character 511 is in a three dimensional computer generated environment 512. The controllable character 511 is configured to be controlled to move within the environment 512 and to interact with the environment 512 and objects within the environment 512 based on user input from user input device 40. A virtual reality device in the form of a virtual reality helmet 514 is provided in the environment 512. FIG. 15 shows the character being controlled to interact with the virtual reality helmet. In further detail, the character has picked up and is putting on the helmet. Once the helmet is on, a virtual reality environment is provided for the controllable character 511.

In response to interacting with the virtual reality helmet, the virtual reality environment is displayed by display apparatus 20. In some embodiments, a transition or other animation is also displayed to give the appearance that the user is entering the virtual environment.

Figure 16:
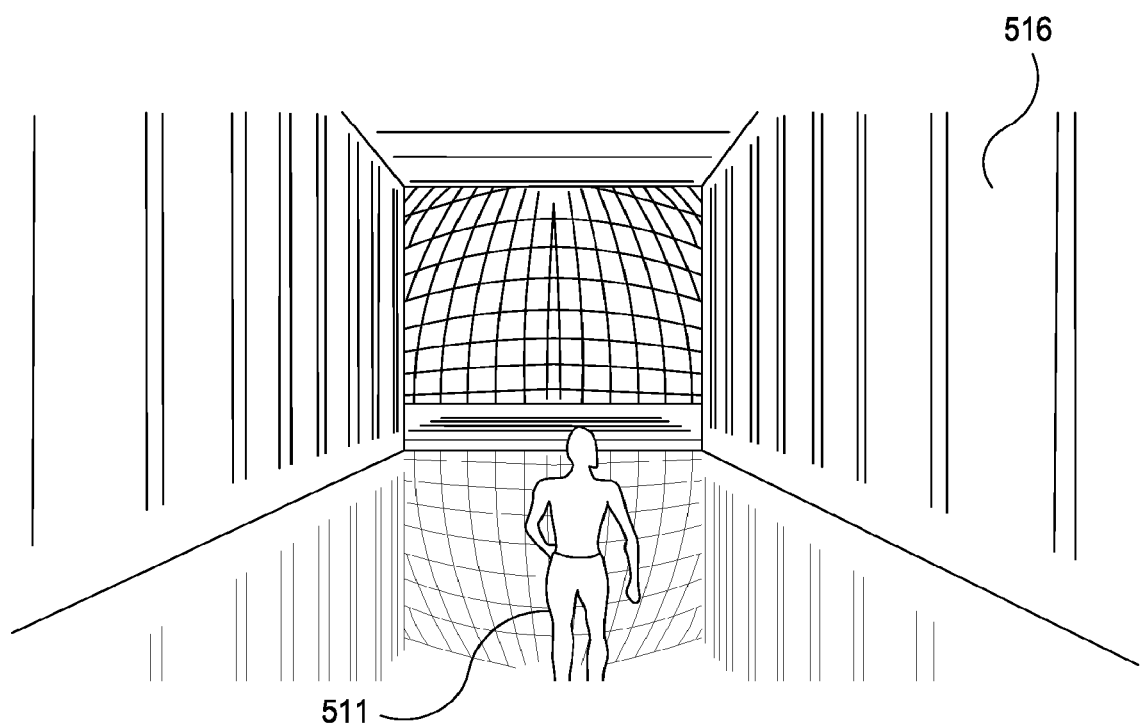
FIG. 16 is an illustration of a screen shot representative of a controllable character in a virtual reality environment.

FIG. 16 shows the controllable character 511 in the virtual reality environment. FIG. 16 may be considered as being displayed in response to the action described with reference to FIG. 15. The controllable character 511 is configured to move within the virtual reality environment 516 and to interact with the virtual reality environment 516 and objects within the virtual reality environment.

In the present embodiment, the virtual reality environment has one or more features or characteristics different to the first three dimensional computer generated environment such that a user can visually distinguish between the first three dimensional computer generated environment and the virtual reality environment. It is clear from comparison of FIGS. 15 and 17 that, in this embodiment, the virtual reality environment is a closed interior environment and the first three dimensional environment is an open world environment. Further differences may also be present, for example, different lighting effects, different physics engines.

The virtual reality environment may provide access for a user to a number of different processes that are substantially different to the gameplay available in the first computer generated environment. Different game modes may be available. The virtual reality environment may provide a user with different options to select, wherein the options are selected by a user interacting with structural elements or other virtual objects in the virtual reality environment. In this way, the virtual reality environment may provide an interactive three dimensional options menu, wherein different options are represented by structural elements or virtual objects. As a non-limiting example, options are represented by doors or entrances, and the user selects the option by entering the door or entrance.

The available options can include, a computer game session that is independent to the game session in which the virtual reality helmet was provide; a further computer process or software that are normally available outside the gaming sessions in which the virtual reality helmet is provided.

In some embodiments, the virtual reality environment provides the user with access to one or more media content items available outside the first three dimensional environment. Non-limiting examples of media content items are described above. In some embodiments, the virtual reality environment provides access to videos (which may be streamed) of other players participating in a game. The game may be taking place in the first three dimensional environment. The game may be an independent game taking place in a further game environment.

In some embodiments, the three dimensional environment is a multi-player environment that more than one user can access. In such embodiments, the virtual reality environment may provide an further environment in which users can interact with each other. In such embodiments, the virtual environment provide a virtual forum for users to interact and communicate. In some embodiments, the virtual reality environment provides a communication interface between users. Additional features of a communication interface may be provided, for example, a video feed or video chat. In some embodiments, users that are distant in the first environment are brought closer together by switching to the virtual reality environment.

In embodiments with more than one user in the first three dimensional environment, a user can view the characters controlled by other users in the three dimensional environment. When a user enters the virtual reality environment by performing the interaction process with the virtual reality object, an idling mode is triggered to provide feedback to other users that the character is in the virtual reality environment. In some embodiments, the idling mode the computer resource of other resources perform an idling animation on the idling character thereby to provide natural character behaviour for other users.

The idling animation may include shuffling feet or whistling. The idling animation may include sitting or lying down, or any other suitable movement where the character remains substantially stationary.

It will be understood that idling animations may be used during other in-game actions, for example, when a viewer has switched to inspection mode to inspect a virtual object for purchase, or a user is viewing a video panel or viewing a video display area.

In some embodiments, the first environment is provided at a first computing resource and the second environment is provided at a second computing resource. As a first non-limiting example the first environment is hosted at a first game server (of a first shared further computing resource) and the virtual reality environment is hosted as a second game server (of a second shared further computing resource).

In the described embodiments, the user is able to switch from a first computer generated environment to a second computer generated environment, the virtual reality environment where the first environment and the second environment are visually distinctive. It will be understood that in some embodiments, the second environment is based on the first environment, for example, the first and second environments may have common structural elements, for example, buildings or walls. The first and second environments may have common objects provided.

In some embodiments, the second environment is substantially the same as the first environment except for the presence or absence of structural elements and/or the presence or absence of virtual objects. In some embodiments, the second environment is substantially the same as the first environment, except for augmented reality features. The augmented reality features may be provided in the second environment such that they are visible only a subset, for example, one or more users in the second environment.

In some embodiments, the two computer generated environments (the virtual reality environment and the first computer generated environment) comprise substantially different sets of objects including structural elements and interactive objects. Interactive objects may have different characteristics in the different worlds.

In some embodiments, the two environments comprises substantially different environmental conditions, for example, weather, lighting, physics engine.

Although in the above described embodiments, the virtual reality device is a helmet, the virtual reality device could be any item with which an interaction can be performed. The virtual reality device could also be any other wearable item. In some embodiments, the virtual reality helmet or other device is made available to purchase or obtain as part of a virtual transaction in the computer generated environment, for example, as part of the method(s) described with reference to FIG. 3 or FIG. 9. In a further example, the shopping environment described with reference to FIG. 3 or FIG. 9 may be the virtual reality environment.

In some embodiments one or more further game features are modified when a user interacts with the virtual reality device or when the user enters the virtual reality environment. For example, a user may control a first character in the first world and a second, different character in the second virtual reality world.

In some embodiments, characters in the different environments have different: appearance behaviour, controls, inventory, wardrobes and/or characteristics. For example, the same character in the first environment may have different characteristics than that character when in the second environment.

In some embodiments, the virtual reality environment comprises a landing stage where different users can interact. In some embodiments, a user is placed directly into a further game mode when interacting with the virtual reality object, for example, a user is placed directly into a game arena, for example, a death-match arena. In further embodiments, more than one virtual environment is available for access by a user and the user selects a virtual environment to be entered prior to entry. In some embodiments, the user has access to more than one virtual reality objects corresponding to different, respective, virtual reality environment such that interaction with each of the virtual reality objects allows access to the corresponding virtual reality environment. In other embodiments, different interaction processes performed with respect to a virtual reality object allows a user to access different virtual reality environments.

In the above described embodiment, the second three dimensional environment is described as a virtual reality environment accessible via interaction with a virtual reality device in the first three dimensional environment. In other embodiments, the first three dimensional computer generated environment is considered as part of the game world for a primary 3D game and the second three dimensional environment is provided as part of a secondary 3D game such that the secondary 3D game is accessed from the first 3D game. In some embodiments, the secondary 3D game shares at least some game elements with the primary 3D game, for example, characters and/or objects. In other embodiments, the secondary 3D game is a separate game with no shared game elements with the primary 3D game. For example, the first three dimensional computer generated environment and necessary components for running the primary 3D game are provided from a first game server and the second three dimensional computer generated environment and necessary components for running the secondary 3D game are provided from a second game server.

It will be understood that methods of the above described embodiments may share common features and furthermore, features of a first described method and/or system may have features of a second described method and/or system.

Figure 17:
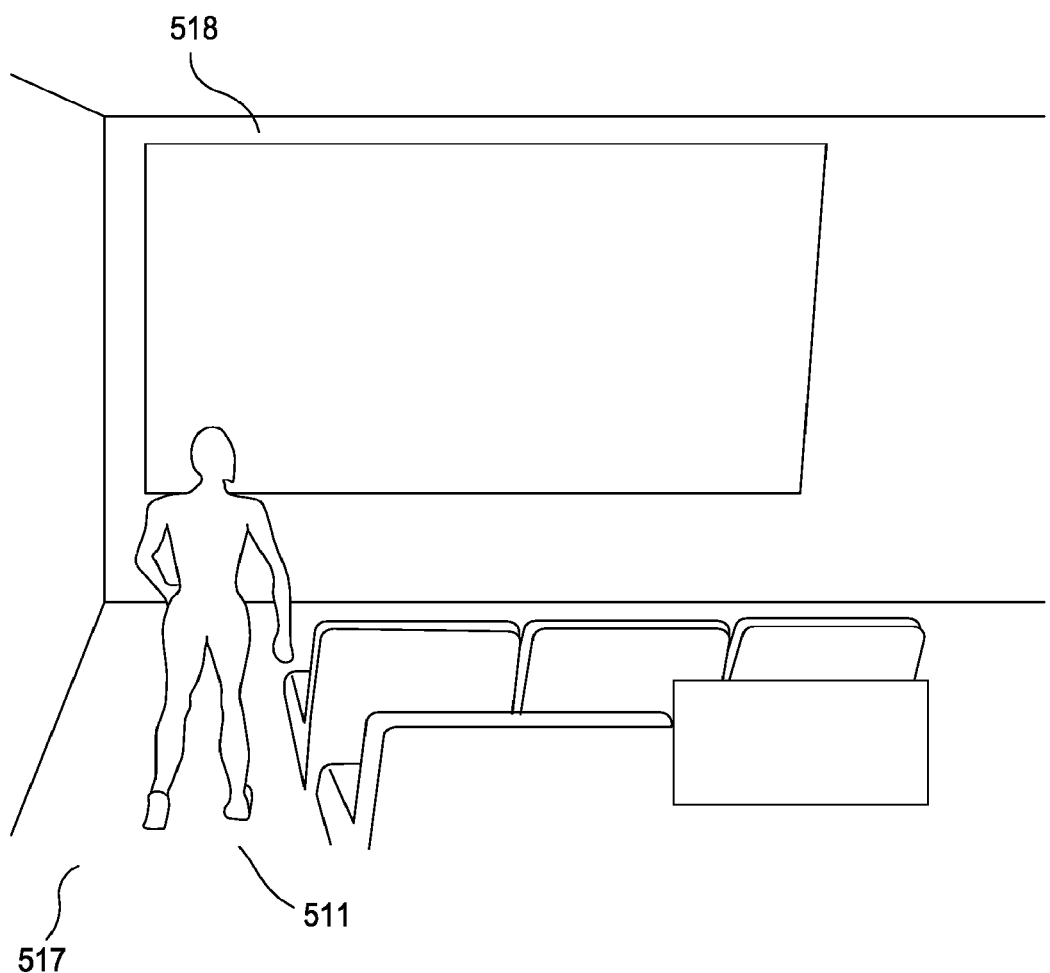
FIG. 17 is an illustration of a screen shot representative of a display area in a virtual reality environment.

As an example, in some embodiments the panel and/or display area is displayed in the virtual reality environment. FIG. 17 shows a controllable character 511 in a region of the virtual reality environment 517. The virtual reality environment is accessed by a user in accordance with the embodiments described above. FIG. 17 shows a display area 518 that is part of the virtual reality environment. The display area 518 is provided as described with reference to method 400. In further embodiments, the panel described with reference to FIG. 10 and/or the shopping environment described with reference to FIG. 3 and/or FIG. 9 are provided in the virtual reality environment.

The panel or display area in the virtual reality environment may be configured substantially as described above with reference to method 300 or 400. In particular one or more media content items may be provided on the panel or display area. In some embodiments, a graphical user interface of a third party media content provider is displayed at the panel or display area which can be controlled by user input. In some embodiments, the user can view or play video games displayed at the panel or display area of the virtual reality environment.

In further embodiments, where a multi-player user environment is provided, scenes and/or video of one or more other users participating in a game or activity occurring in the computer-generated environment or in a further computer-generated environment, for example, a virtual reality environment or a game world environment are displayed to the user. The scenes and/or video can be presented to the user via the video panel and/or via an image display area and/or in a virtual reality environment. In contrast to above described embodiments, where displayed video corresponds to media content available outside the three dimensional computer generated environment and is retrieved form a further computing resource 50 (for example, a data store of a media content provider) to be displayed on, for example, the panel, the displayed video in this embodiment is retrieved from the game server of shared further computing resource 72 and/or from other users computers. The displayed content is live or playback video footage of activity happening either in the three dimensional computer generated environment of the user or a further three dimensional computer generated environment.

Figure 18:
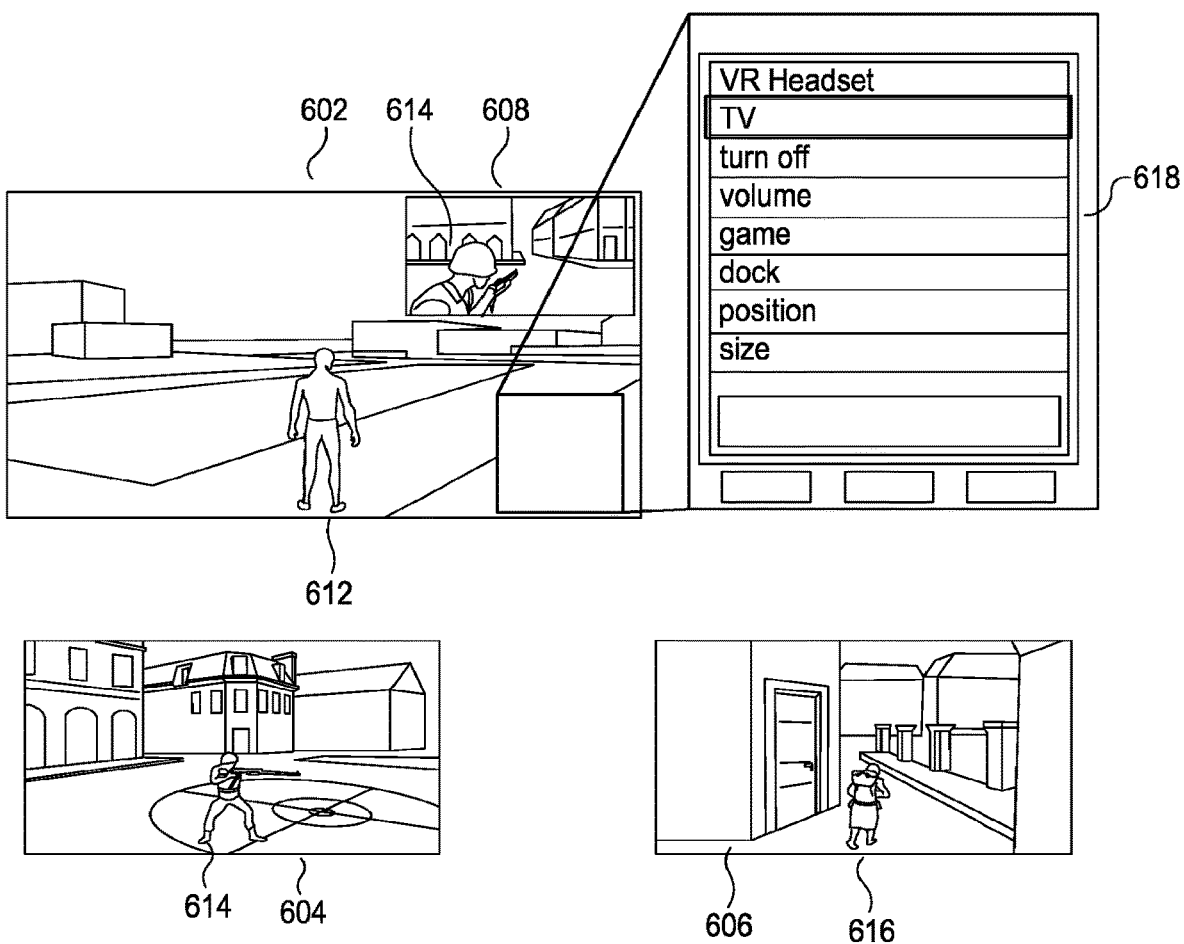
FIG. 18 is an illustration of three screen shots representative of a user spectating a game played by two further users, while in the three dimensional computer generated environment.

FIG. 18 shows illustrations of three screenshots (602, 604, 606) generated by the three different computing apparatuses (30a, 30b and 30c) and displayed on associated display apparatuses. The first screenshot 602 shows a first user character 612 herein referred to as the spectator 612 in the three dimensional environment with a panel 608 displayed as described with reference to the method 300 shown in FIG. 10. The second and third screenshots are views of a game occurring in a further computer generated environment. The second screenshot 604 shows a second user character 614 in the further computer generated environment, herein referred to as the first participant in the. The third screenshot 606 shows a third user character 616 in the further computer generated environment, herein referred to as the second participant character 616. The second user character 614 and third user character 616 are participating in a game occurring in the further computer generated environment and the spectator 612 is spectating the game via the video panel 608.

Game scenes are generated using game data retrieved from the game server of shared further computing resource 72 for viewing on the display apparatus of the first computing apparatus 30a.

One or more viewing options are available to the spectator 612. For example, the spectator 612 may select one or more different live views of the game. The selection can be made from interactive menu element 618, provided on the screen of the first user. As shown in FIG. 18, in some embodiments, the view selected by the spectator is different to the view displayed to the participants. FIG. 18 shows a view from a close proximity angle shown to the spectator. The view is over the shoulder of the first participant 614. The user can select which participant to follow by making the appropriate selection from interactive menu element 618.

Although only two participants are shown, it will be understood that a larger number of participants is possible.

As a further example of a shared features, processor 32 (for example character circuitry) is configured to determine when a user is watching content on the panel or at the display area by processing game data and/or when a user has entered a further virtual environment. In a non-limiting example, this determination is based on a recorded movement of the character, in particular, if the character is substantially static for a predetermined period of time or there has been a period where user input is not received, and content is being displayed on panel or display area, then processor 32 can determine that user is watching content or in a virtual environment. Processor 32 may further automatically initiate a paused game mode in response to determining that the user is watching content. In the paused game mode, the character may be static and cannot be interacted with by other users. A character in paused mode may be indicated graphically to other users. In paused mode, the character may be immune to damage through interaction with elements of the environment.

As a further example of shared features, access to one or more third party gaming and/or social media platforms is provided through to a user in the three dimensional environment. This may be provided via an augmented video player, image display area, via a menu option or through a virtual reality environment. In such embodiments, an identifier that is generated and provided to a user in response to performing a real-world transaction (as described with reference to method 200) is redeemable by a user in said third party platforms.

As a further example of shared features, the media content provided for display via augmented video player, image display area, via a menu option or in a virtual environment, can be hosted and retrieved from a media content server that is separate from the game server of shared further computing resource 72. In some embodiments, communication with the media content server is performed in accordance with a protocol of the media content server, for example, third party application protocol interface (API). In some embodiments, a user has an account with the media content provider and this can be linked with their game account. A user can then launch a graphical user interface provided by the media content provider and request media content using the graphical user interface. It will be understood that the graphical user interface can be presented in the augmented video player, the image display area, via a menu option or in the virtual environment. The graphical user interface allows the user to access their account and retrieve media content via the described API. The graphical user interface may provide further functionality to the user beyond that offered in the three dimensional environment, for example, searching, adding to lists, ratings, browsing categories. In accordance with these embodiments, a user can link their game account to video streaming service provider (for example, Netflix) and launch a Netflix API within a game session. The Netflix API may have its own window/controls that beyond that provided within the game session.

Each feature disclosed in the description and (where appropriate) the claims and drawings may be provided independently or in any appropriate combination.

It is claimed:

1. A method comprising:
generating a first three dimensional computer-generated environment including a player avatar controllable by a user within the first three dimensional computer-generated environment;
displaying, within the first three dimensional computer-generated environment, a portion of a second three dimensional computer-generated environment at a location visible to the player avatar, the second three dimensional computer-generated environment having one or more features or characteristics different from the first three dimensional computer-generated environment including an independent game or game mode available within the second three dimensional computer-generated environment and not available in the first three dimensional computer-generated environment;
disabling interaction with the first player avatar by other avatars within the first three dimensional computer generated environment while the player avatar is engaged in viewing the portion of the second three dimensional computer generated environment;
accepting interaction by the player avatar with the portion of the second three dimensional computer-generated environment indicating that the player avatar wishes to join the second three dimensional computer-generated environment; and
causing the player avatar to transition from the first three dimensional computer-generated environment to the second three dimensional computer-generated environment in response to the interaction to participate in the independent game or game mode therein.

2. The method of claim 1 wherein the portion is a two dimensional display visible within the first three dimensional computer-generated environment.

3. The method of claim 1 wherein the transition from the first three dimensional computer-generated environment requires a transition from a selected one of (a) a first server to a second server, (b) a first game mode to a second game mode, (c) a first set of game rules to a second set of game rules, (d) a first virtual location to a second virtual location, or (e) a landing stage prior to entering the second three dimensional computer-generated environment.

4. The method of claim 1 wherein a second player avatar of another user is shown on the portion of the second three dimensional computer-generated environment participating in a game or activity presently taking place and into which the player avatar can join.

5. The method of claim 1 wherein the interaction comprises interaction by the player avatar with a subset of the three dimensional computer-generated environment that enables the transition.

6. The method of claim 5 wherein the subset is a door or entrance.

7. The method of claim 5 wherein the interaction is the user controlling the player avatar so as to move the player avatar through the subset to cause the transition.

8. A system for transition between three dimensional computer-generated environments comprising non-transitory computer-readable storage medium including instructions which cause a processor to:

generate a first three dimensional computer-generated environment including a player avatar controllable by a user within the first three dimensional computer-generated environment;
display, within the first three dimensional computer-generated environment, a portion of a second three dimensional computer-generated environment at a location visible to the player avatar, the second three dimensional computer-generated environment having one or more features or characteristics different from the first three dimensional computer-generated environment including an independent game or game mode available within the second three dimensional computer-generated environment and not available in the first three dimensional computer-generated environment;
disable interaction with the first player avatar by other avatars within the first three dimensional computer generated environment while the player avatar is engaged in viewing the portion of the second three dimensional computer generated environment;
accept interaction by the player avatar with the portion of the second three dimensional computer-generated environment indicating that the player avatar wishes to join the second three dimensional computer-generated environment; and
cause the player avatar to transition from the first three dimensional computer-generated environment to the second three dimensional computer-generated environment in response to the interaction to participate in the independent game or game mode therein.

9. The system of claim 8 wherein the portion is a two dimensional display visible within the first three dimensional computer-generated environment.

10. The system of claim 8 wherein the transition from the first three dimensional computer-generated environment requires a transition from a selected one of (a) a first server to a second server, (b) a first game mode to a second game mode, (c) a first set of game rules to a second set of game rules, (d) a first virtual location to a second virtual location, or (e) a landing stage prior to entering the second three dimensional computer-generated environment.

11. The system of claim 8 wherein a second player avatar of another user is shown on the portion of the second three dimensional computer-generated environment participating in a game or activity presently taking place and into which the player avatar can join.

12. The system of claim 8 wherein the interaction comprises interaction by the player avatar with a subset of the three dimensional computer-generated environment that enables the transition.

13. The system of claim 12 wherein the subset is a door or entrance.

14. The system of claim 13 wherein the interaction is the user controlling the player avatar so as to move the player avatar through the subset to cause the transition.

15. The system of claim 8 further comprising:
a processor;
a memory;
and wherein the processor executes the instructions on the non-transitory computer-readable storage medium.

16. A system comprising a computing device including:
computer-readable storage medium;
memory; and
a processor executing instructions to cause the processor to:
generate a first three dimensional computer-generated environment including a player avatar controllable by a user within the first three dimensional computer-generated environment;

display, within the first three dimensional computer-generated environment, a portion of a second three dimensional computer-generated environment at a location visible to the player avatar, the second three dimensional computer-generated environment having one or more features or characteristics different from the first three dimensional computer-generated environment including an independent game or game mode available within the second three dimensional computer-generated environment and not available in the first three dimensional computer-generated environment;

disable interaction with the first player avatar by other avatars within the first three dimensional computer generated environment while the player avatar is engaged in viewing the portion of the second three dimensional computer generated environment;

accept interaction by the player avatar with the portion of the second three dimensional computer-generated environment indicating that the player avatar wishes to join the second three dimensional computer-generated environment; and cause the player avatar to transition from the first three dimensional computer-generated environment to the second three dimensional computer-generated environment in response to the interaction to participate in the independent game or game mode therein.

17. The system of claim 16 wherein the portion is a two dimensional display visible within the first three dimensional computer-generated environment.

18. The system of claim 16 wherein the transition from the first three dimensional computer-generated environment requires a transition from a selected one of (a) a first server to a second server, (b) a first game mode to a second game mode, (c) a first set of game rules to a second set of game rules, (d) a first virtual location to a second virtual location, or (e) a landing stage prior to entering the second three dimensional computer-generated environment.

19. The system of claim 16 wherein the interaction comprises interaction by the player avatar with a subset of the three dimensional computer-generated environment that enables the transition.

20. The system of claim 19 wherein the interaction is the user controlling the player avatar so as to move the player avatar through the subset to cause the transition.

* * * * *